United States Patent
Shulyak et al.

(10) Patent No.: US 12,182,574 B2
(45) Date of Patent: Dec. 31, 2024

(54) TECHNIQUE FOR PREDICTING BEHAVIOUR OF CONTROL FLOW INSTRUCTIONS

(71) Applicant: Arm Limited, Cambridge (GB)

(72) Inventors: Alexander Cole Shulyak, Austin, TX (US); Yasuo Ishii, Austin, TX (US); Dam Sunwoo, Austin, TX (US); Houdhaifa Bouzguarrou, Austin, TX (US)

(73) Assignee: Arm Limited, Cambridge (GB)

( * ) Notice: Subject to any disclaimer, the term of this patent is extended or adjusted under 35 U.S.C. 154(b) by 49 days.

(21) Appl. No.: 18/312,052

(22) Filed: May 4, 2023

(65) Prior Publication Data
US 2024/0370266 A1    Nov. 7, 2024

(51) Int. Cl.
  *G06F 9/38*      (2018.01)
  *G06F 12/0875*   (2016.01)
(52) U.S. Cl.
  CPC ........ *G06F 9/3806* (2013.01); *G06F 12/0875* (2013.01); *G06F 2212/452* (2013.01)
(58) Field of Classification Search
  None
  See application file for complete search history.

(56) References Cited

U.S. PATENT DOCUMENTS 6,006,317 A   12/1999  Ramagopal et al.
6,694,425 B1   2/2004  Eickemeyer
(Continued)

OTHER PUBLICATIONS

U.S. Appl. No. 18/454,158, filed Aug. 23, 2023, Bouzguarrou et al.
(Continued)

*Primary Examiner* — Eric Coleman
(74) *Attorney, Agent, or Firm* — NIXON & VANDERHYE P.C.

(57) ABSTRACT

An apparatus is provided having pointer storage to store pointer values for a plurality of pointers, with the pointer values of the pointers being differentially incremented in response to a series of increment events. Tracker circuitry maintains a plurality of tracker entries, each tracker entry identifying a control flow instruction and a current active pointer (from amongst the pointers) to be associated with that control flow instruction. Cache circuitry maintains a plurality of cache entries, each cache entry storing a resolved behaviour of an instance of a control flow instruction identified by a tracker entry along with an associated tag value generated when the resolved behaviour was allocated into that cache entry. For a given entry the associated tag value may be generated in dependence on an address indication of the control flow instruction whose resolved behaviour is being stored in that entry and the current active pointer associated with that control flow instruction. Prediction circuitry is responsive to a prediction trigger associated with a replay of a given instance of a given control flow instruction identified by a tracker entry, to cause a lookup operation to be performed by the cache circuitry using a comparison tag value generated in dependence on the address indication of the given control flow instruction and the current active pointer. In the event of a hit being detected in a given cache entry, the resolved behaviour stored in the given cache entry is used as the predicted behaviour of the given instance of the given control flow instruction, provided a prediction confidence metric is met.

20 Claims, 13 Drawing Sheets

(56) References Cited

U.S. PATENT DOCUMENTS

| | | |
|---|---|---|
| 10,846,097 B2 | 11/2020 | Jumani et al. |
| 2004/0255104 A1 | 12/2004 | Akkary et al. |
| 2005/0138480 A1 | 6/2005 | Srinivasan et al. |
| 2011/0238917 A1* | 9/2011 | Lin .................. G06F 9/3808 |
| | | 711/125 |
| 2016/0092230 A1* | 3/2016 | Chen .............. G06F 9/30065 |
| | | 712/241 |
| 2016/0350116 A1 | 12/2016 | Reddy et al. |
| 2017/0010820 A1 | 1/2017 | Day |
| 2018/0088953 A1* | 3/2018 | Lin ................. G06F 12/0875 |
| 2020/0050459 A1* | 2/2020 | Palivela ............ G06F 9/3848 |
| 2020/0104137 A1* | 4/2020 | Natarajan .......... G06F 9/3848 |
| 2020/0174794 A1 | 6/2020 | Golla |
| 2021/0081575 A1 | 3/2021 | Saileshwar |
| 2021/0124586 A1 | 4/2021 | Bouzguarrou |
| 2021/0240476 A1 | 8/2021 | Kountanis |
| 2022/0197650 A1 | 6/2022 | Soundararajan |
| 2023/0057600 A1* | 2/2023 | Malley ............... G06F 9/3875 |

OTHER PUBLICATIONS

U.S. Appl. No. 18/454,165, filed Aug. 23, 2023, Bouzguarrou et al.
U.S. Appl. No. 18/462,742, filed Sep. 7, 2023, Bouzguarrou et al.
Office Action dated Aug. 9, 2023 for U.S. Appl. No. 17/851,266, 11 pages.
U.S. Appl. No. 17/851,266, filed Jun. 28, 2022, Pusdesris et al.
Akkary, H. et al. "Recycling Waste: Exploiting Wrong-Path Execution to Improve Branch Prediction" ICS'03, Jun. 23-26, 2003, pp. 12-21 (10 pages).
Mutlu, O. et al. "On Reusing the Results of Pre-Executed Instructions in a Runahead Execution Processor" IEEE Computer Architecture Letters, 2005, vol. 4 (4 pages).

* cited by examiner

```
for (i = 0; i < N; i++){
        if (hard_to_predict){          // Branch A
                if (data[i]){          // Branch B
                        ...
                }
        }
}
```

FIG. 2

```
if (long_latency_hard_to_predict){
        ...
} if (short_latency_hard_to_predict){
        ....
}
```

FIG. 3

```
for (i=0; i < N; i++){
        if (long_latency_hard_to_predict){      // Branch A
                ...
        } if (short_latency_hard_to_predict){     // Branch B
                ...
        }
}
```

FIG. 4A short[i=0] = T      long[i=0] = T
short[i=1] = T      long[i=1] = N*
short[i=2] = N      long[i=2] = ?
short[i=3] = T      long[i=3] = ?

FIG. 4B

```
for (i=0; i < N; i++){
        for (j=0; j < N; j++){    // Loop iteration count hard to predict
                ...
        }
}
if (hard_to_predict){                // Branch A
        ...
}
```

FIG. 5

TECHNIQUE FOR PREDICTING BEHAVIOUR OF CONTROL FLOW INSTRUCTIONS

BACKGROUND

The present technique relates to the area of data processing, and more particularly to control flow prediction.

In a data processing system, instructions can be executed speculatively. For example, conditional control flow instructions determine which sequence of later instructions (control flow path) will subsequently be executed. A particular example of a conditional control flow instruction is a conditional branch instruction. In such systems, execution of a conditional control flow instruction can involve predicting the conditional control flow instruction's outcome before the instruction has been executed. This allows the data processing system to speculatively execute later instructions on the control flow path indicated by the predicted outcome of the control flow instruction. Speculative execution of instructions in this way allows the later instructions to be executed sooner than would be possible if the data processing system was forced to wait until the outcome of the earlier instruction was known, which may improve the performance of the data processing system. If the prediction of the outcome of a conditional control flow instruction is later determined to have been incorrect, the later instructions executed from the incorrect control flow path are flushed from the pipeline of the data processing system, with the data processing system then executing instructions on the correct control flow path.

It is desirable to develop prediction mechanisms that increase the accuracy of prediction of the outcome of control flow instructions, as the more accurately the prediction mechanism operates, the less need there will be to flush instructions from the pipeline, and hence the performance impact of incorrect predictions will be reduced.

SUMMARY

In a first example arrangement, there is provided an apparatus comprising: pointer storage to store pointer values for a plurality of pointers; increment circuitry, responsive to a series of increment events, to differentially increment the pointer values of the pointers; tracker circuitry to maintain a plurality of tracker entries, each tracker entry to identify a control flow instruction and a current active pointer to be associated with that control flow instruction, where the current active pointer is selected from amongst the plurality of pointers; cache circuitry to maintain a plurality of cache entries, each cache entry to store a resolved behaviour of an instance of a control flow instruction identified by a tracker entry of the tracker circuitry along with an associated tag value generated when the resolved behaviour was allocated into that cache entry, and for each entry in at least a subset of the entries the associated tag value is generated in dependence on an address indication of the control flow instruction whose resolved behaviour is being stored in that entry and the current active pointer associated with that control flow instruction; and prediction circuitry, responsive to a prediction trigger associated with a replay of a given instance of a given control flow instruction identified by a tracker entry of the tracker circuitry, to cause a lookup operation to be performed by the cache circuitry using a comparison tag value generated in dependence on the address indication of the given control flow instruction and the current active pointer, and in the event of a hit being detected in a given cache entry, to use the resolved behaviour stored in the given cache entry as the predicted behaviour of the given instance of the given control flow instruction, provided a prediction confidence metric is met.

In another example arrangement, there is provided a method of predicting behaviour of control flow instructions, comprising: maintaining pointer values for a plurality of pointers and, responsive to a series of increment events, differentially incrementing the pointer values of the pointers; employing tracker circuitry to maintain a plurality of tracker entries, each tracker entry identifying a control flow instruction and a current active pointer to be associated with that control flow instruction, where the current active pointer is selected from amongst the plurality of pointers; employing cache circuitry to maintain a plurality of cache entries, each cache entry for storing a resolved behaviour of an instance of a control flow instruction identified by a tracker entry of the tracker circuitry along with an associated tag value generated when the resolved behaviour was allocated into that cache entry, and for each entry in at least a subset of the entries the associated tag value is generated in dependence on an address indication of the control flow instruction whose resolved behaviour is being stored in that entry and the current active pointer associated with that control flow instruction; and responsive to a prediction trigger associated with a replay of a given instance of a given control flow instruction identified by a tracker entry of the tracker circuitry, causing a lookup operation to be performed by the cache circuitry using a comparison tag value generated in dependence on the address indication of the given control flow instruction and the current active pointer, and in the event of a hit being detected in a given cache entry, using the resolved behaviour stored in the given cache entry as the predicted behaviour of the given instance of the given control flow instruction, provided a prediction confidence metric is met.

In a still further example arrangement, there is provided a computer-readable medium to store computer-readable code for fabrication of a data processing apparatus comprising: pointer storage to store pointer values for a plurality of pointers; increment circuitry, responsive to a series of increment events, to differentially increment the pointer values of the pointers; tracker circuitry to maintain a plurality of tracker entries, each tracker entry to identify a control flow instruction and a current active pointer to be associated with that control flow instruction, where the current active pointer is selected from amongst the plurality of pointers; cache circuitry to maintain a plurality of cache entries, each cache entry to store a resolved behaviour of an instance of a control flow instruction identified by a tracker entry of the tracker circuitry along with an associated tag value generated when the resolved behaviour was allocated into that cache entry, and for each entry in at least a subset of the entries the associated tag value is generated in dependence on an address indication of the control flow instruction whose resolved behaviour is being stored in that entry and the current active pointer associated with that control flow instruction; and prediction circuitry, responsive to a prediction trigger associated with a replay of a given instance of a given control flow instruction identified by a tracker entry of the tracker circuitry, to cause a lookup operation to be performed by the cache circuitry using a comparison tag value generated in dependence on the address indication of the given control flow instruction and the current active pointer, and in the event of a hit being detected in a given cache entry, to use the resolved behaviour stored in the given cache entry as the predicted behaviour of the given instance of the given control flow instruction, provided a prediction confidence metric is met. Such computer-readable code can be disposed in any known transitory computer-readable medium (such as wired or wireless transmission of code over a network) or non-transitory computer-readable medium such as semiconductor, magnetic disk, or optical disc.

In a yet further example arrangement there is provided a system comprising: the apparatus according to the above-mentioned first example arrangement, implemented in at least one packaged chip; at least one system component; and a board, wherein the at least one packaged chip and the at least one system component are assembled on the board.

In a still further example arrangement there is provided a chip-containing product comprising the above-mentioned system assembled on a further board with at least one other product component.

BRIEF DESCRIPTION OF THE DRAWINGS

The present technique will be described further, by way of illustration only, with reference to examples thereof as illustrated in the accompanying drawings, in which:

FIG. 2 illustrates an example of a guard instruction;

FIG. 3 illustrates an example of hard to predict instructions having different latencies;

FIG. 4A shows an example in which a FOR loop contains a long latency branch instruction and a short latency branch instruction, whilst FIG. 4B shows the corresponding storage that can be used to perform replay prediction;

FIG. 5 shows how FOR loop indexing can be polluted;

DESCRIPTION OF EXAMPLES

Figure 1:
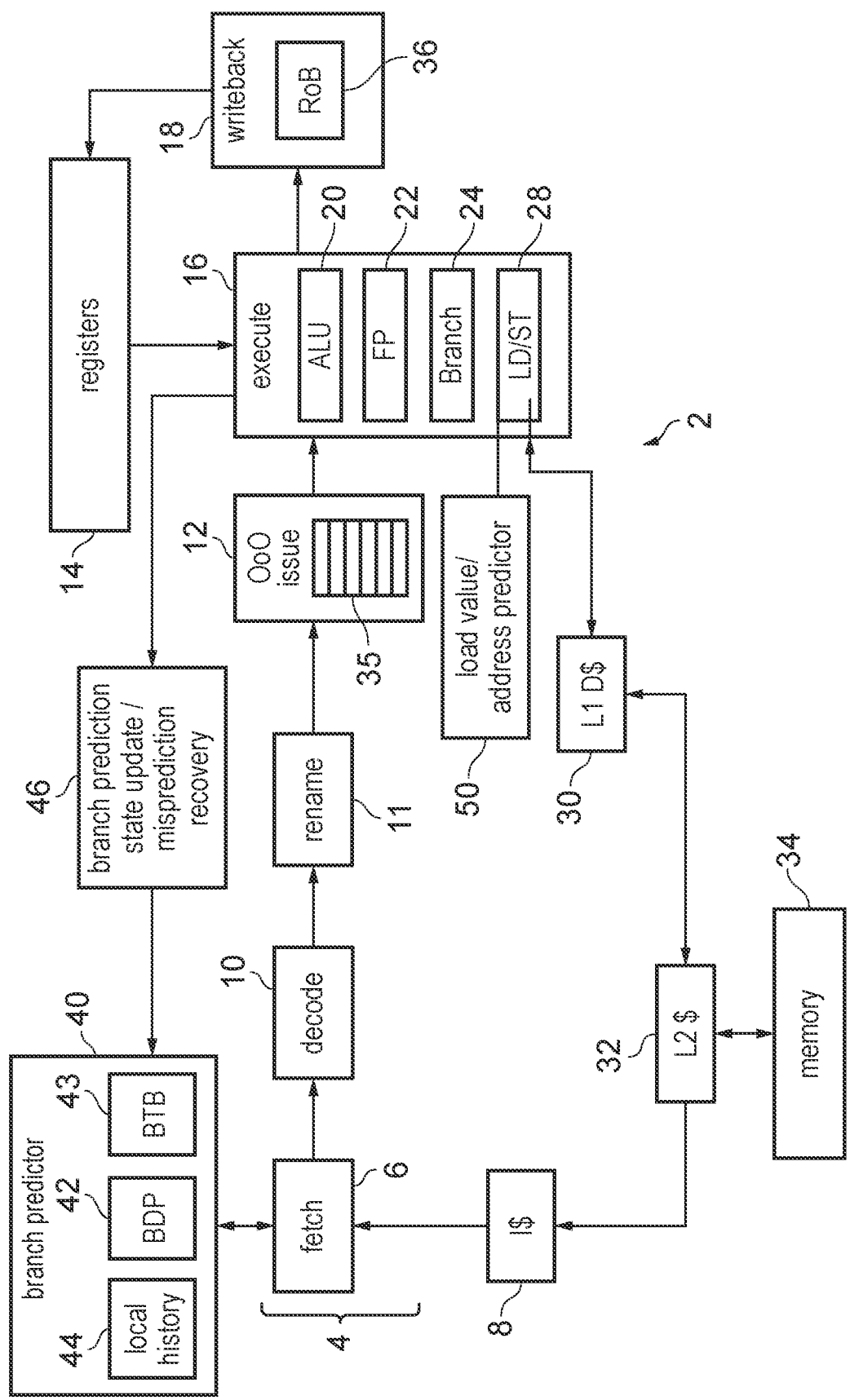
FIG. 1 schematically illustrates an example of a data processing apparatus.

Rather than using global history for control flow (e.g. branch) instruction prediction, one could consider the history of other recently executed branch instructions. This, however, can be problematic in the face of out-of-order execution in which a later branch prediction is rewound due to an earlier branch instruction being mispredicted. In this case, the series of branch outcomes taken to get to the later branch prediction instruction will be different in each case and so the previous execution of the later branch instruction does not help.

Replay prediction makes it possible to use the previous execution result (behaviour) of a branch instruction that was rewound due to a misprediction of an earlier instruction. This is particularly useful in the case of program loops (such as FOR loops) where an iteration of the FOR loop might be repeated due to rewinding. In this case, if the previous execution result of a branch instruction is kept, this result could serve as a reasonable prediction of the branch instruction's behaviour when the same iteration number is re-reached. However, it remains difficult to tell, at a hardware level, which iteration a loop is in. This is because, at the instruction level, all that is seen are branch instructions, which might be branches or loops. Further complicating this is the fact that certain program structures can make it difficult to count the loop iteration number. It would therefore be desirable to provide a replay prediction mechanism that can enable replay prediction to occur more accurately. It would also be desirable to produce an area efficient design, so as for example to allow a larger number of control flow instructions to be tracked by the replay prediction mechanism for a given size/area cost associated with the provision of the replay prediction mechanism.

In accordance with one example implementation, an apparatus is provided that has pointer storage to store pointer values for a plurality of pointers, and increment circuitry that is responsive to a series of increment events to differentially increment the pointer values of the pointers. This approach provides a pool of pointers whose values are incremented in response to increment events, but where the evaluation of whether and/or how to increment the value of any given pointer in response to any given increment event is performed such that over time the pointer values of the different pointers will increment differently with respect to each other. Hence, over time the pointers will take different values dependent on the observed increment events. As will be apparent from the subsequent discussion, the aim is to seek to associate, with any given control flow instruction that is seeking to be tracked, one of the pointers, and in particular to seek to identify a pointer whose pointer value is incremented in a way that correlates with occurrences of the given control flow instruction, or put another way a pointer whose pointer value will increment at the same rate at which any encapsulating loop containing the given control flow instruction iterates.

In accordance with the technique described herein, the apparatus also has tracker circuitry to maintain a plurality of tracker entries, where each tracker entry is used to identify a control flow instruction and a current active pointer to be associated with that control flow instruction, where the current active pointer is selected from amongst the plurality of pointers. Cache circuitry is also provided to maintain a plurality of cache entries, where each cache entry is used to store a resolved behaviour of an instance of a control flow instruction identified by a tracker entry of the tracker circuitry, along with an associated tag value generated when the resolved behaviour was allocated into that cache entry. For each entry in at least a subset of the entries the associated tag value is generated in dependence on an address indication of the control flow instruction whose resolved behaviour is being stored in that entry and the current active pointer associated with that control flow instruction.

Whilst the associated tag value could be generated in the above manner for all entries, as will be discussed in more detail later, in one example implementation the same cache structure is also used to store the resolved behaviours with associated tag values that are generated in dependence on a current training pointer (again chosen from the plurality of pointers, but differing from the current active pointer), and hence at any point in time there may be at least one entry for which the associated tag value is generated in dependence on an address indication of the control flow instruction whose resolved behaviour is being stored in that entry and a current training pointer associated with that control flow instruction.

The apparatus also provides prediction circuitry, responsive to a prediction trigger associated with a replay of a given instance of a given control flow instruction identified by a tracker entry of the tracker circuitry, to cause a lookup operation to be performed by the cache circuitry using a comparison tag value generated in dependence on the address indication of the given control flow instruction and the current active pointer. In the event of a hit being detected in a given cache entry, the prediction circuitry then uses the resolved behaviour stored in the given cache entry as the predicted behaviour of the given instance of the given control flow instruction, provided a prediction confidence metric is met.

In situations where the current active pointer chosen for association with a given control flow instruction being tracked by the tracker circuitry does in fact increment in a way that correlates with occurrences of the given control flow instruction, then this can enable accurate predictions to be made of the outcome of that given control flow instruction during multiple iterations of an encapsulating loop.

Further, in accordance with the technique described herein, a shared cache structure is used to maintain the resolved behaviours of each of the control flow instructions being tracked by the tracker entries of the tracker circuitry, which can lead to a very efficient design when compared with an approach that instead seeks to maintain separate storage structures for each of the tracked control flow instructions into which to store the resolved behaviours of those tracked control flow instructions. In particular, for a given area/size, it is possible using the technique described herein to track a larger number of control flow instructions than would be possible were separate storage structures required to be maintained for each of the tracked control flow instructions in order to store their resolved behaviours. Further, the use of the shared cache structure provides enhanced flexibility, as the amount of history (the number of resolved behaviours) that can be maintained for any given tracked control flow instruction can be varied dependent on the total number of control flow instructions being tracked at any point in time.

It has been found that by employing the mechanism described herein, significantly improved performance can be realised with regards to prediction accuracy of the outcomes (behaviours) of control flow instructions.

In one example implementation, each tracker entry further provides an active pointer confidence indication for the current active pointer. Then, each time a resolved behaviour is provided for the given control flow instruction, the cache circuitry is arranged to perform a lookup operation using the comparison tag value. In the event of the comparison tag value matching the associated tag value stored in an accessed entry of the plurality of cache entries, the tracker circuitry is arranged to update the active pointer confidence indication in the tracker entry for the given control flow instruction in dependence on whether the provided resolved behaviour matches the resolved behaviour stored in the accessed entry. The prediction circuitry can then be arranged to reference the active pointer confidence indication as stored in the tracker entry when determining whether the prediction confidence metric is met. For instance, the prediction circuitry may be arranged to determine that the prediction confidence metric is met if the active pointer confidence indication has reached or exceeded a determined threshold.

Which cache entries are accessed during any particular lookup operation may vary dependent on the organisation of the cache structure. For example, if the cache structure is arranged as a fully associative cache, then all of the cache entries may be accessed during the lookup operation in order to determine whether there is a hit condition (i.e. an entry whose stored associated tag value matches the comparison tag value used during the lookup operation) whereas for a set associative cache a single set within the cache structure may be identified, and each of the cache entries within that set may then be accessed.

There are various ways in which the tracker circuitry may update the active pointer confidence indication of a given tracker entry. In one example implementation, the tracker circuitry is arranged to update the active pointer confidence indication in the tracker entry for the given control flow instruction to indicate an enhanced confidence when the provided resolved behaviour matches the resolved behaviour stored in the accessed entry, and to otherwise update the active pointer confidence indication in the tracker entry for the given control flow instruction to indicate a decreased confidence. In an alternative implementation, it may be decided to update the active pointer confidence indication to indicate an enhanced confidence when the provided resolved behaviour matches the resolved behaviour stored in the accessed entry, but otherwise not to make any update to the active pointer confidence indication.

In one example implementation, the decision as to whether to adjust the active pointer confidence indication to indicate an enhanced or decreased confidence may be dependent on one or more additional factors. For example, the tracker circuitry may be arranged to inhibit update of the active pointer confidence indication in the tracker entry for the given control flow instruction when the resolved behaviour stored in the accessed entry indicates the same behaviour as would be predicted by a reference prediction mechanism. In particular, in one example implementation it will be the case that the reference prediction mechanism will be used by default, and the replay mechanism described herein will then only be employed if the reference prediction mechanism is proving not to be sufficiently accurate. In such cases, it can be beneficial to only update the active pointer confidence indication in situations where the resolved behaviour stored in the accessed entry, if used, would result in a different prediction to that that would be obtained from the reference prediction mechanism. The reference prediction mechanism could take a variety of forms, but in one example implementation could take the form of a TAGE (TAgged GEometric length) predictor, a TAGE predictor employing several predictor tables indexed through independent functions of the global branch/path history and the branch address. A TAGE predictor can provide reliable predictions in many instances, but may not be able to provide reliable predictions for certain control flow instructions (which may be referred to herein as hard to predict (HTP) control flow instructions), and it has been found that the replay prediction mechanism described herein can enable more reliable predictions to be made for such HTP control flow instructions.

There are various ways in which the tag values used when accessing the cache entries may be generated. In one example implementation, the apparatus further comprises tag value generation circuitry to apply a tag value generation function to generate the associated tag values stored in cache entries and the comparison tag values used in lookup operations, the tag value generation function using as inputs an address indication of a selected control flow instruction and pointer information of a pointer to be associated with that selected control flow instruction. Hence, by combining the address indication of the control flow instruction with pointer information of the associated pointer, this enables a tag value to be generated that varies in dependence on the pointer used.

The pointer information used in the tag value generation function may take a variety of forms, but in one example implementation comprises a pointer indication to identify the pointer, and the pointer value of the identified pointer. Hence, both the current pointer value at the time the tag value is generated, and an identifier of the particular pointer being used, are taken into account when generating the tag value.

The tag value generation function can take a variety of forms, but in one example implementation takes the form of a hash function. In one particular example implementation, the hash function takes as inputs a program counter value indicative of the address of the control flow instruction under consideration, an identifier of the pointer indicated as the current active pointer for the control flow instruction under consideration, and the pointer value of that current active pointer. Any suitable hash function can be used, and indeed the form of hash function, and/or the number of bits forming the generated tag value, can be varied dependent on implementation, for example with the aim of reducing any potential aliasing issue (as could arise were different combinations of program counter values, pointer identifiers and pointer values to produce the same tag value).

In order to seek to determine the most appropriate pointer to associate with any given control flow instruction to be tracked by the tracker circuitry, in one example implementation a training process may be performed. The aim of the training process is to seek to identify which pointer, when associated with the given control flow instruction, gives the highest confidence indication, and hence results in the best likelihood of the prediction mechanism producing accurate predictions of the behaviour of the given control flow instruction.

There are various ways in which the training process can be performed, but in one example implementation the training process occurs in the background, in parallel with the use of a current active pointer, and makes use of the earlier described tracker circuitry and cache circuitry. In particular, in one example implementation, each tracker entry further identifies a current training pointer to be associated with the control flow instruction identified by that tracker entry and a training pointer confidence indication for the current training pointer, where the current training pointer is selected from amongst the plurality of pointers. Typically, the current training pointer will differ from the current active pointer and the aim of the training process is to determine whether the current training pointer produces more accurate results than the current active pointer, and hence should be used as a new current active pointer in place of the existing current active pointer.

To achieve this, then in one example implementation, each time a resolved behaviour is provided for the given control flow instruction, the cache circuitry is arranged to perform a further lookup operation using a further comparison tag value generated in dependence on the address indication of the given control flow instruction and the current training pointer, and in the event of the further comparison tag value matching the associated tag value stored in a further accessed entry of the plurality of cache entries accessed during the further lookup operation, the tracker circuitry is arranged to update the training pointer confidence indication in the tracker entry for the given control flow instruction in dependence on whether the provided resolved behaviour matches the resolved behaviour stored in the further accessed entry.

Hence, it will be appreciated that, in accordance with such an approach, each time a resolved behaviour is provided for the given control flow instruction, two lookup procedures may be performed, one using the current active pointer and one using the current training pointer, and the relevant confidence indications may be updated accordingly in dependence on the outcome of those lookup operations. In one example implementation, if only one of the two lookup operations results in the associated confidence indication needing to be incremented, and that associated confidence indication is already at a saturated level, then instead the other confidence indication can be decremented.

In accordance with the above described approach, then at some point an assessment needs to be made as to whether the current training pointer is performing better than the current active pointer (i.e. has a confidence indication greater than the confidence indication of the current active pointer). In accordance with one example implementation, this is achieved by arranging each tracker entry to further identify a training counter which is incremented in response to each occurrence of a training event. The training event can take a variety of forms, but in one particular example implementation the training event is determined to occur whenever an update is made to at least one of the active pointer confidence indication and the training pointer confidence indication of the associated tracker entry. Hence, each time a provided resolved behaviour triggers the above described lookup process within the cache, then the training counter may be arranged to be incremented provided at least one of the active pointer confidence indication and the training pointer confidence indication is updated as a result of that lookup process.

Further, in accordance with one example implementation the tracker circuitry is responsive to the training counter reaching a determined threshold for a given tracker entry, to determine whether the training pointer confidence indication indicates a greater confidence than is indicated by the active pointer confidence indication. In that event the given tracker entry is updated to identify the current training pointer as being the current active pointer, and to select another pointer from the plurality of pointers as a new current training pointer. The above described training process can then be repeated for the new current training pointer.

In one particular example implementation, when the training pointer confidence indication indicates a greater confidence than is indicated by the active pointer confidence indication, the tracker circuitry is further arranged to update the given tracker entry to identify the current training pointer confidence indication as being the active pointer confidence indication, to reset the training pointer confidence indication for the new current training pointer, and to reset the training counter.

There are various ways in which the new current training pointer can be selected in such a situation, but in one example implementation the aim is to cycle through the various pointers for each tracked control flow instruction in order to determine which one performs best. Hence, in one example implementation the selection of the new current training pointer is made according to a selection algorithm that seeks to allow all pointers to be used as training pointers over time. The selection algorithm can take a variety of forms, but in one example implementation may be a round robin algorithm.

In accordance with the above described technique, and in particular due to the fact that the training counters associated with the individual tracker entries are incremented at a rate that is dependent on how often a resolved behaviour is observed for the associated control flow instruction, it can be seen that the rate at which training occurs for any given control flow instruction will vary in dependence upon how frequently that given control flow instruction is encountered, and hence allows the training to be performed more quickly for the more commonly appearing control flow instructions. The fact that such more frequently occurring control flow instructions are trained more quickly can provide significant benefits, as they are the control flow instructions that will give rise to the best improvement in performance if they are predicted correctly.

The increment events that cause the increment circuitry to evaluate which pointers should have their values updated can take a variety of forms. However, in one example implementation, the increment event is determined to have occurred each time a backwards taken branch is observed. A backwards taken branch can be considered to be any instruction that causes the program counter value to decrease (or remain the same). That is, instructions for which the control flow goes backwards through the system. In the case of a FOR loop, this typically corresponds with the end of the body of the FOR loop as the program returns back to the test-and-iterate part of the FOR loop.

The resolved behaviour stored in a given cache entry may take a variety of forms, but in one example implementation is a branch direction outcome of an instance of a control flow instruction identified by a tracker entry of the tracker circuitry, hence identifying whether the branch was taken or not taken.

There are various ways in which the increment circuitry can be arranged to decide which pointers should have their pointer values adjusted in response to any given increment event. However, in one example implementation the increment circuitry is arranged, in response to a given increment event, to increment the pointer values of one or more of the pointers in dependence on a plurality of different increment evaluation functions applied by the increment circuitry, where each increment evaluation function is associated with one of the pointers in the plurality of pointers and is used to determine whether to increment the pointer value of the associated pointer in response to the given increment event.

The evaluation functions can take any desired form. Merely by way of specific example, the evaluation functions may be such that each occurrence of an increment event causes half of the counters to have their values incremented, but which counters are incremented is randomly distributed based on the increment event in question. In the example where the increment event is a backwards taken branch, the program counter value of the backwards taken branch could for example be evaluated such that the bit values of that program counter value influence which counters are incremented. For instance, a first pointer could have its value incremented for every backwards taken branch irrespective of the program counter value, a second pointer could be arranged never to be incremented irrespective of the program counter value, a third pointer could be incremented if a hash of all of the program counter bits is 1, a fourth pointer could be incremented if the hash of all the program counter bits is 0, etc.

In one example implementation, when performance of the lookup operation that occurs when a resolved behaviour is provided for a given control flow instruction results in a cache miss, the cache circuitry may be arranged to perform an allocation operation to allocate a cache entry within which to store the resolved behaviour for the given control flow instruction along with the comparison tag value as the stored associated tag value. In such a situation, then in one example implementation no adjustment is made to the active pointer confidence indication in the event of such a cache miss.

In one example implementation the same process may also be performed in respect of the further lookup operation performed using the further comparison tag value generated in dependence on the current training pointer, so that again a cache miss will result in an allocation operation being performed to allocate a cache entry within which to store the resolved behaviour for the given control flow instruction along with the further comparison tag value as the stored associated tag value. As with the situation described above when discussing a cache miss for the lookup operation performed using the current active pointer, in one example implementation no adjustment is made to the training pointer confidence indication in the event of a cache miss.

It has been found that the above described techniques can provide for significantly improved prediction performance for a variety of control flow instructions than would be achieved by using other prediction mechanisms. However, it may still be the case that there are certain control flow instructions for which it is difficult to obtain accurate predictions. For example, some hard to predict control flow instructions may be provided within a software function that is called from multiple different places within program code, and the behaviour of that hard to predict control flow instruction may depend upon where that function is called from within the program code. As a result, the correlation that is seeking to be determined using the above described technique may be difficult to realise due to the behaviour of that hard to predict control flow instruction varying in such a way.

In order to seek to improve the prediction accuracy for such hard to predict control flow instructions, then in one example implementation the tracker circuitry may be arranged to maintain a plurality of additional tracker entries. At least when a given condition is met, the tracker circuitry may be arranged to allocate one or more of the additional tracker entries for the given control flow instruction, each allocated additional tracker entry providing an enhanced control flow instruction identifier determined from an address of the given control flow instruction and identifier information indicative of from where within a program a function containing the given control flow instruction is called. The information indicative of from where within a program a function containing the given control flow instruction is called can take a variety of forms, but in one example implementation this information is incorporated by XORing a return stack program counter value (which identifies where within the program code execution will return to once the function containing the given control flow instruction has completed) with the program counter value of the given control flow instruction.

When considering the given control flow instruction as tracked in a given additional tracker entry, the enhanced control flow instruction identifier stored in the given additional tracker entry is used as the address indication when generating the associated tag values stored in cache entries and the comparison tag values used in lookup operations. Hence, the same cache structure and lookup process can be employed as used in respect of the normal tracker entries, and as with the normal tracker entries the additional tracker entries may also include an active pointer identifier and an active pointer confidence indication, a training pointer identifier, a training pointer confidence indication, and a training counter, so that those additional tracker entries can be utilised in much the same way as the normal tracker entries. However, due to the incorporation of information that is indicative of where the function containing a hard to predict control flow instruction is called from, the use of the additional tracker entries can result in improved prediction accuracy for certain types of control flow instruction for which good prediction accuracy performance may not be achieved using the normal tracker entries.

The trigger that causes an additional tracker entry to be populated may vary dependent on implementation. For instance, in one example implementation it may be decided to always populate an additional tracker entry as well as a standard tracker entry for a control flow instruction that it is decided to track within the above described apparatus. The training mechanism could then have the standard tracker entry compete with the additional tracker entry to determine which one produces a higher level of confidence, with that one then being used for future predictions. However, in one example implementation an additional tracker entry is only populated for a given control flow instruction when a low prediction confidence is detected for that given control flow instruction by the standard tracker entry following a given training period. That training period can be chosen as desired, but by way of example may involve at least one training iteration through all of the pointers, with the best performing of those pointers then being reflected as the current active pointer, and if after that period of time a certain level of mispredictions still occurs when predicting the behaviour of the given control flow instruction, a decision may be taken to allocate an additional tracker entry for that given control flow instruction, with the training process then being performed for that additional tracker entry.

There are various ways in which the tracker circuitry may maintain the additional tracker entries. For example, the standard tracker entries and additional tracker entries may be maintained within a single table structure, but in one example implementation separate table structures are provided for the standard tracker entries and the additional tracker entries. It may be a matter of design choice as to how many additional tracker entries to provide, and various mechanisms could be used to decide when to overwrite existing contents of additional tracker entries so as to enable new control flow instructions to be allocated into the additional tracker entries. If desired, a lock mechanism could be used to cause the contents of one or more additional tracker entries to be prevented from being overwritten, if for example those contents are yielding highly accurate predictions for the control flow instructions currently tracked in those additional tracker entries.

In some example implementations, at the time of allocating a given control flow instruction to an additional tracker entry, the corresponding standard tracker entry for that given control flow instruction may be invalidated, but in an alternative implementation both entries may be maintained in parallel. There are various ways in which a decision may be taken as to whether to allow the contents of the additional tracker entry to be used for prediction. For example, it may be the case that the prediction based on the additional tracker entry is used when the active pointer confidence indication associated with that entry exceeds a certain threshold level. Such an approach can be used irrespective of whether the corresponding standard tracker entry is maintained or not, but if the corresponding standard tracker entry is also maintained, then predictions could continue to be made from the standard tracker entry until such time as the active pointer confidence indication associated with the additional tracker entry exceeds the above-mentioned threshold.

As an alternative approach, if both the additional tracker entry and the corresponding standard tracker entry are maintained for the same given control flow instruction, then a prediction using the contents of the additional tracker entry could be used in one example implementation if the active pointer confidence indication of that entry exceeds the active pointer confidence indication of the corresponding standard tracker entry, and hence in such a scenario the active pointer confidence indications of both entries could be compared to decide which one is used to provide a prediction at any given point in time.

In some examples, the apparatus further comprises flush circuitry configured to generate a flush in response to a control flow misprediction, and the flush circuitry is configured to maintain contents of the tracker circuitry and the cache circuitry during the flush. When a control flow misprediction occurs (e.g. when the result of the condition on which a branch is predicated turns out to be other than what was predicted), a rewind occurs by flushing the pipeline to the point of the conditional control flow instruction that was mispredicted. In these examples, the contents of the tracker circuitry and the cache circuitry are maintained. Hence, the behaviour associated with control flow instructions that executed remains stored for a future replay prediction to occur. Consequently, the processing associated with difficult to predict instructions is not lost or wasted.

In some examples, the data processing apparatus further comprises recover circuitry configured to recover a previous value of the plurality of pointers in response to the flush. The pointer values are therefore reset to a point of the misprediction thereby allowing the pointers to be used in order to perform replay predictions.

Particular embodiments will now be described with reference to the figures.

FIG. 1 schematically illustrates an example of a data processing apparatus 2. The data processing apparatus 2 has a processing pipeline 4 which includes a number of pipeline stages. In this example, the pipeline stages include a fetch stage 6 for fetching instructions from an instruction cache 8; a decode stage 10 for decoding the fetched program instructions to generate micro-operations to be processed by remaining stages of the pipeline; a register renaming stage 11 for mapping architectural registers specified by program instructions or micro-operations to physical register specifiers identifying physical registers in a register file 14; an issue stage 12 for checking whether operands required for the micro-operations are available in a register file 14 and issuing micro-operations for execution once the required operands for a given micro-operation are available; an execute stage 16 for executing data processing operations corresponding to the micro-operations, by processing operands read from the register file 14 to generate result values; and a writeback stage 18 for writing the results of the processing back to the register file 14. It will be appreciated that this is merely one example of possible pipeline architecture, and other systems may have additional stages or a different configuration of stages.

The execute stage 16 includes a number of processing units, for executing different classes of processing operation. For example the execution units may include a scalar arithmetic/logic unit (ALU) 20 for performing arithmetic or logical operations on scalar operands read from the registers 14; a floating point unit 22 for performing operations on floating-point values; a branch unit 24 for evaluating the outcome of branch operations and adjusting the program counter which represents the current point of execution accordingly; and a load/store unit 28 for performing load/store operations to access data in a memory system 8, 30, 32, 34.

In this example, the memory system includes a level one data cache 30, a level one instruction cache 8, a shared level two cache 32 and main system memory 34. It will be appreciated that this is just one example of a possible memory hierarchy and other arrangements of caches can be provided. The specific types of processing unit 20 to 26 shown in the execute stage 16 are just one example, and other implementations may have a different set of processing units or could include multiple instances of the same type of processing unit so that multiple micro-operations of the same type can be handled in parallel. It will be appreciated that FIG. 1 is merely a simplified representation of some components of a possible processor pipeline architecture, and the processor may include many other elements not illustrated for conciseness.

The processor shown in FIG. 1 is an out-of-order processor where the pipeline 4 includes a number of features supporting out-of-order processing. This includes the issue stage 12 having an issue queue 35 for queuing instructions and issue control circuitry which is able to issue a given instruction for execution if its operands are ready, even if an earlier instruction in program order has not issued yet. Also the writeback stage 18 may include a reorder buffer (ROB) 36 which tracks the execution and the commitment of different instructions in the program order, so that a given instruction can be committed once any earlier instructions in program order have themselves be committed. Also, the register renaming stage 11 helps to support out of order processing by remapping architectural register specifiers specifying the instructions decoded by the decode stage 10 to physical register specifiers identifying physical registers 14 provided in hardware. The instruction encoding may only have space for register specifiers of a certain limited number of bits which may restrict the number of architectural registers supported to a relatively low number such as 16 or 32. This may cause register pressure, where after a certain number of instructions have been processed a later instruction which independent of an earlier instruction which references a particular register needs to reuse that register for storing different data values. In an in-order processor, that later instruction would need to wait until the earlier reference to the same register has completed before it can proceed, but these register dependencies caused by insufficient number of architectural registers can be avoided in an out-of-order processor by remapping the references to the same destination register in different instructions to different physical registers within the register file 14, which may comprise a greater number of physical registers than the number of architectural registers supported in the instruction encoding. This can allow a later instruction which writes to a particular architectural register to be executed while an earlier instruction which writes to the same architectural register is stalled, because those register references are mapped to different physical registers in the register file 14. It will be appreciated that other features may support out of order processing.

As shown in FIG. 1, the apparatus 2 has a number of prediction mechanisms for predicting instruction behaviour for instructions at particular instruction addresses. For example, these prediction mechanisms may include a branch predictor 40 and a load value or load address predictor 50. It is not essential for processors to have both forms of predictor. The load value or load address predictor is provided for predicting data values to be loaded in response to load instructions executed by the load/store unit 28 and/or predicting load addresses from which the data values are to be loaded before the operands for calculating the load addresses have been determined. For example, the load value prediction may record previously seen values loaded from a particular address, and may predict that on subsequent instances of loading from that address the value is expected to be the same. Also, the load address predictor may track history information which records observed stride patterns of address accesses (where the addresses of successive loads differ by a constant offset) and then use that observed stride pattern to predict the address of a future load instructions by continuing to add offsets to the latest seen address at intervals of the detected stride.

Also, the branch predictor 40 may be provided for predicting outcomes of branch instructions, which are instructions which can cause a non-sequential change of program flow. Branches may be performed conditionally, so that they may not always be taken. The branch predictor is looked up based on addresses of instructions provided by the fetch stage 6, and provides a prediction of whether those instruction addresses are predicted to correspond to branch instructions. For any predicted branch instructions, the branch predictor provides a prediction of their branch properties such as a branch type, branch target address and branch direction (branch direction is also known as predicted branch outcome, and indicates whether the branch is predicted to be taken or not taken). The branch predictor 40 includes a branch target buffer (BTB) 43 for predicting properties of the branches other than branch direction, and a branch direction predictor (BDP) 42 for predicting the not taken/taken outcome of a branch (branch direction). It will be appreciated that the branch predictor could also include other prediction structures, such as a call-return stack for predicting return addresses for function calls, a loop direction predictor for predicting when a loop controlling instruction will terminate a loop, or other specialised types of branch prediction structures for predicting behaviour of branches in specific scenarios. The BTB 43 may have any known BTB design and will not be described in detail here. In general the BTB may act as a cache correlating particular instruction addresses with sets of one or more branch properties such as branch type or the branch target address (the address predicted to be executed next after the branch if the branch is taken), and may also provide a prediction of whether a given instruction address is expected to correspond to a branch at all.

The branch direction predictor 42 may be based on a variety of (or even multiple) different prediction techniques, e.g. a TAGE predictor and/or a perceptron predictor, which includes prediction tables which track prediction state used to determine whether, if a given instruction address is expected to correspond to a block of instructions including a branch, whether that branch is predicted to be taken or not taken. The BDP 42 may base its prediction on local history records tracked in local history storage circuitry 44. In the present techniques, one of the prediction techniques that is used is a replay predictor in which the previous execution of an instruction that is subsequently rewound can be used as a basis for predicting the outcome of its re-execution.

The apparatus 2 may have branch prediction state updating circuitry and misprediction recovery circuitry 46, which updates state information within the branch predictor 40 based on observed instruction behaviour seen at the execute stage 16 for branch instructions executed by the branch unit 24. When the branch instruction is executed and the observed behaviour for the branch matches the prediction made by the branch predictor 40 (both in terms of whether the branch is taken or not and in terms of other properties such as branch target address) then the branch prediction state updating circuitry 46 may update prediction state within the BDP 42 or the BTB 43 to reinforce the prediction that was made so as to make it more confident in that prediction when that address is seen again later. Alternatively, if there was no previous prediction state information available for a given branch then when that branch is executed at the execute stage 16, its actual outcome is used to update the prediction state information. Similarly, the local history storage 44 may be updated based on an observed branch outcome for a given branch. On the other hand, if a misprediction is identified when the actual branch outcome 24 differs from the predicted branch outcome in some respect, then the misprediction recovery portion of the state updating/misprediction recovery circuitry 46 may control updating of state within the branch predictor 40 to correct the prediction state so that it is more likely that the prediction will be correct in future. In some cases, a confidence counter-based mechanism may be used so that one incorrect prediction does not necessarily overwrite the prediction state which has previously been used to generate a series of correct predictions, but multiple mispredictions for a given instruction address will eventually cause the prediction state to be updated so that the outcome actually being seen at the execute stage 60 is predicted in future. As well as updating the state information within the branch predictor 40, on a misprediction, the misprediction recovery circuitry may also cause instructions to be flushed from the pipeline 4 which are associated with instruction addresses beyond the address for which the misprediction was identified, and cause the fetch stage 6 to start refetching instructions from the point of the misprediction.

Selecting entries of the BDP 42 based on instruction address alone may not give accurate predictions in all cases, because it is possible that the same instruction address could be reached by different paths of program flow depending on outcomes of previous instructions, and depending on the path taken to reach the current instruction, this may lead to different actual instruction behaviour for the same instruction address.

One solution to this is to select predictions based on history information which tracks a sequence of previously seen instruction behaviour. Global history can be used as the branch history format. In particular, a sequence of taken and not taken outcomes for a series of branches can be tracked. The outcome of other branch instructions can then be correlated with the current branch history over time, in order to enable future predictions to be made.

A downside to this approach is that the same global history might be seen for multiple branch instructions. For instance, the sequence NNTTTNNT (assuming a global history of 8 branch instructions is considered) might be encountered for two branch instructions at completely different addresses. In this situation, it is unlikely that there would be any correlation between the outcome of the two distant branch instructions even though the global history technically matches.

Another possibility might be to use local history, which involves correlating the outcome of a branch instruction to the global history seen at that branch instruction (i.e., the history local to that branch instruction). This solution can work well. However, it can require maintaining a large amount of data for each branch instruction. For instance, since each branch instruction might be encountered with different frequencies and along different paths, it may be necessary to track the history multiple times-once for each branch instruction. A further difficulty with using local history is that in many cases, the local history might not be relevant. For instance, consider the situation illustrated in FIG. 2. Here, branch A acts as a guard for branch B. In other words, branch B is only encountered dependent on the outcome of branch A. The outcome of branch A forms part of the local history of branch B. However, this information is irrelevant because the entry in the local history for branch A will always be the same value.

Separately to this, it is also desirable to enable replay prediction. In a speculative out-of-order processor, instructions can be executed in an order other than how they appear in the program itself in order to improve overall efficiency of execution. In such situations, some later branch instructions might resolve while the result of an earlier branch instruction is waiting for resolution. For instance, in the example of FIG. 3, the short latency hard to predict condition might be expected to resolve before the long latency hard to predict condition is resolved. Under normal circumstances, if the long latency instruction was mispredicted then a 'rewind' occurs that causes the program to revert to the state that it was in at the time the long latency instruction was executed. This is done in order to prevent the wrong execution path being taken. However, as a consequence of this, the prediction and outcome data generated for the short latency instruction is lost. In practice, however, since execution of the short latency instruction is not dependent on the long latency instruction, the previous execution of that instruction is likely to be a very good guide as to how the instruction will execute when it is reexecuted. Hence, it would be beneficial for the result of executing the short latency instruction to be kept (despite the rewind) in order to be available for a future 'replay prediction'. Note, however, that history-based predictors may not be able to help with such replays. This is because the history taken to get to the short latency instruction will be different between the two executions due to the misprediction. In particular, the long latency instruction is taken in one execution and not taken in the other. With differing history information, it is difficult if not impossible to form a prediction of the short latency instruction.

In accordance with the techniques described herein, a mechanism is used that makes it possible to index previous behaviours of a branch instruction according to indexes of FOR loops within the program. Each instance of a given instruction can therefore be individually recognised (a branch instruction that occurs outside a FOR loop simply has an index of 0). If the same iteration/index is encountered again in the future (e.g. due to a replay that occurs after a rewind due to a misprediction event) then the previous behaviour of that branch instruction for that iteration/index can be used as the prediction for the direction in which the branch instruction will go.

An example of this is illustrated in FIGS. 4A and 4B. FIG. 4A shows an example in which a FOR loop contains a long latency branch instruction and a short latency branch instruction. In this example, it is assumed that a misprediction occurs with the second iteration (i=1) of the long latency instruction. That is to say that a prediction is made for one direction and on resolution it is determined that the prediction was incorrect. However, because the long latency instruction is followed by a short latency instruction and because these can be performed out of order, the situation arises in which several further executions of later iterations of the short latency instruction are made before the second iteration of the long latency instruction is resolved thereby revealing the misprediction and resulting in a rewind. In these situations, it would be desirable to store the results of those executions to form the basis of future predictions.

FIG. 4B shows the storage of the data. As described earlier, the indexing is carried out based on the index of the FOR loop. Due to the difference in latencies, more (4) executions of the short latency instruction are made as compared to the long latency instruction (2). When the rewind occurs, the program returns to the second iteration (i=1) of the loop and the long latency instruction is taken (rather than not taken, which was the incorrect prediction). However, the executions performed for the third and fourth iterations (i=3 and i=4) of the short latency instruction remain stored. Then, when the third and fourth iterations are reached for the second time, the previous executions of those iterations can form the basis of predictions for the short latency branch instruction.

A difficulty with this approach is aligning the indexing of the branch behaviour with the index of the FOR loop. In particular, at the time of instruction execution there may be nothing to distinguish a FOR loop from any other branch instruction. Even then, it may not be immediately obvious how to determine which variable (e.g., which value in which register) is used as the index for the FOR loop. One approach to solving this problem is to count backwards taken branches (i.e., instructions where the value of the program counter has decreased as compared to its previous value) and to use this as the index. A loop such as a FOR loop will contain a backwards taken branch at the end of the main body. By keeping a running count of such branches through execution of the program, it is possible to unique identify each instance of each instruction.

However, even this approach is not without difficulty. In particular, such a pointer can become polluted. For example, consider the situation shown in FIG. 5. Here, an outer FOR loop is present, which contains an inner FOR loop, whose index is hard to predict. Indeed, the iteration count might always be different (or could even be random). By the time branch A is reached, the backwards taken branch pointer could point to a variety of locations. Consequently, the index at which the behaviour of branch A is stored may have no relation to the index of the outer FOR loop. This therefore makes any replay impractical since it is very difficult to determine the previous behavioural execution of branch A for a given iteration of the outer FOR loop.

In accordance with the techniques described herein, this problem is alleviated by providing a plurality of pointers. Not every pointer is updated at every backwards taken branch instruction. In some cases, some pointers could be updated with every backwards taken branch instruction. Other pointers could be updated only every M backwards taken branch instructions. Some backwards taken branch instructions might update multiple (or even all) pointers. By maintaining a number of pointers, each of which is updated differently, it is expected that one of the pointers will be incremented in correspondence with the FOR loop index.

Figure 6:
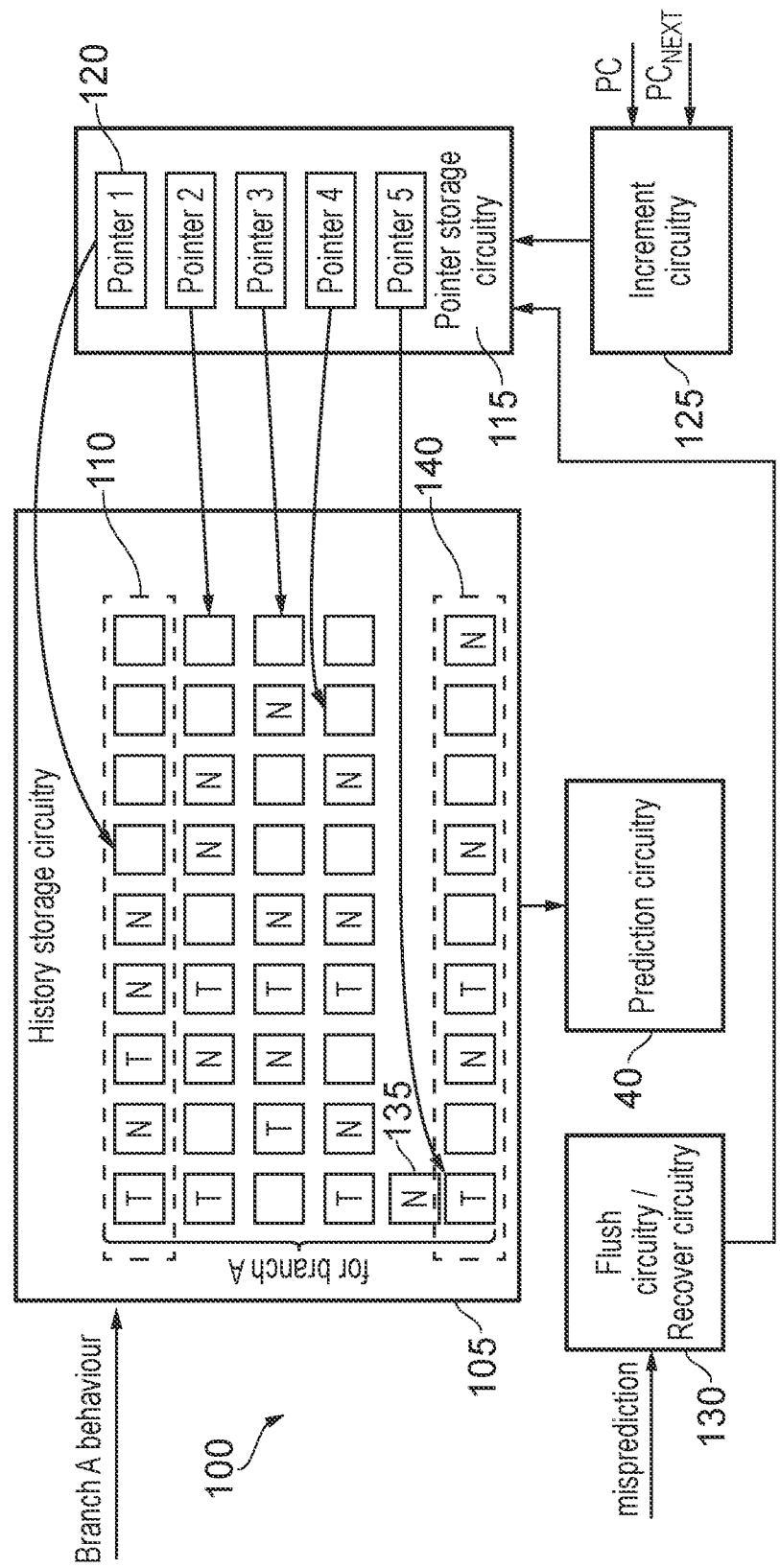
FIG. 6 schematically illustrates an example of a data processing apparatus.

FIG. 6 illustrates an example of a data processing apparatus 100 in accordance with some examples. The data processing apparatus 100 includes history storage circuitry 105. This stores six sets 110 of behaviours of instances of a control flow instruction that are usable to predict the behaviour of that control flow instruction (branch A) during a replay situation. It will be appreciated that multiple pluralities of sets may be provided—each for a different control flow instruction. Pointer storage circuitry 115 is provided that stores a plurality of pointers 120, with each of the pointers 120 being associated with one of the sets 110 of behaviours. The pointer is used to index entries into the sets. That is, each pointer indicates where a next entry into the associated set should be stored. In this example, the actual behaviours are the same, but the set of behaviours differs due to the indexing. In this example, the behaviours are (in order) TNTNN. However, the sets differ because in some instances, there are gaps between some of the behaviours. The differences in the behaviours arise due to differences in how the pointers 120 in the pointer storage circuitry 115 are updated by the increment circuitry 125. In particular, the increment circuitry receives a current program counter value (PC) and the program counter value of a next instruction (PCNEXT). If PCNEXT is less than or equal to PC, then the current instruction is a backwards taken branch and one or more of the pointers are updated.

Two special sets 135, 140 may be stored for each control flow instruction. The first of these sets 135 tracks only the most recent prediction that has been made for the control flow instruction. The second set 140 has its pointer incremented for all backwards taken control flow instructions.

Prediction circuitry 40 is provided to make a prediction of the future behaviour of the control flow instruction (e.g. branch A) based on one of the sets. It is hoped that the set that would be selected is one that corresponds with the FOR loop. A training process can be performed to determine which set of behaviours to use. With one of the set having been selected, the corresponding pointer is used to index into that set. If a previous behaviour is stored then this can be used to form the basis of the prediction for the control flow instruction. Otherwise, more common prediction techniques can be used. That is, if one set 110 has been selected and if the corresponding pointer 120 currently refers to index '3' then it is determined whether the set 110 has an entry at index 3. If so, then a previous execution of the branch A at this iteration has occurred and the behaviour (T) can be used to predict how branch A will perform again (e.g. it will be taken). If the entry is empty then no previous behaviour has been recorded for the current iteration and so no prediction is made in this way. Other prediction techniques can be used instead.

Finally in FIG. 6, flush circuitry and recover circuitry 130 (which are shown as a single device) are provided. In response to a misprediction on a control flow instruction, this causes a flush of the pipeline to occur. As part of this process, the values of the pointers 120 are reset to a value that they had at the time of the mispredicted instruction being issued. However, the contents of the history storage circuitry 105 are not touched as a consequence of the flush. That is the flush itself does not count as a backwards taken branch instruction and the behaviours of the instructions that follow the mispredicted instruction are not erased from the history storage circuitry 105 and thus can be used to form the basis of a later prediction.

Figure 7:
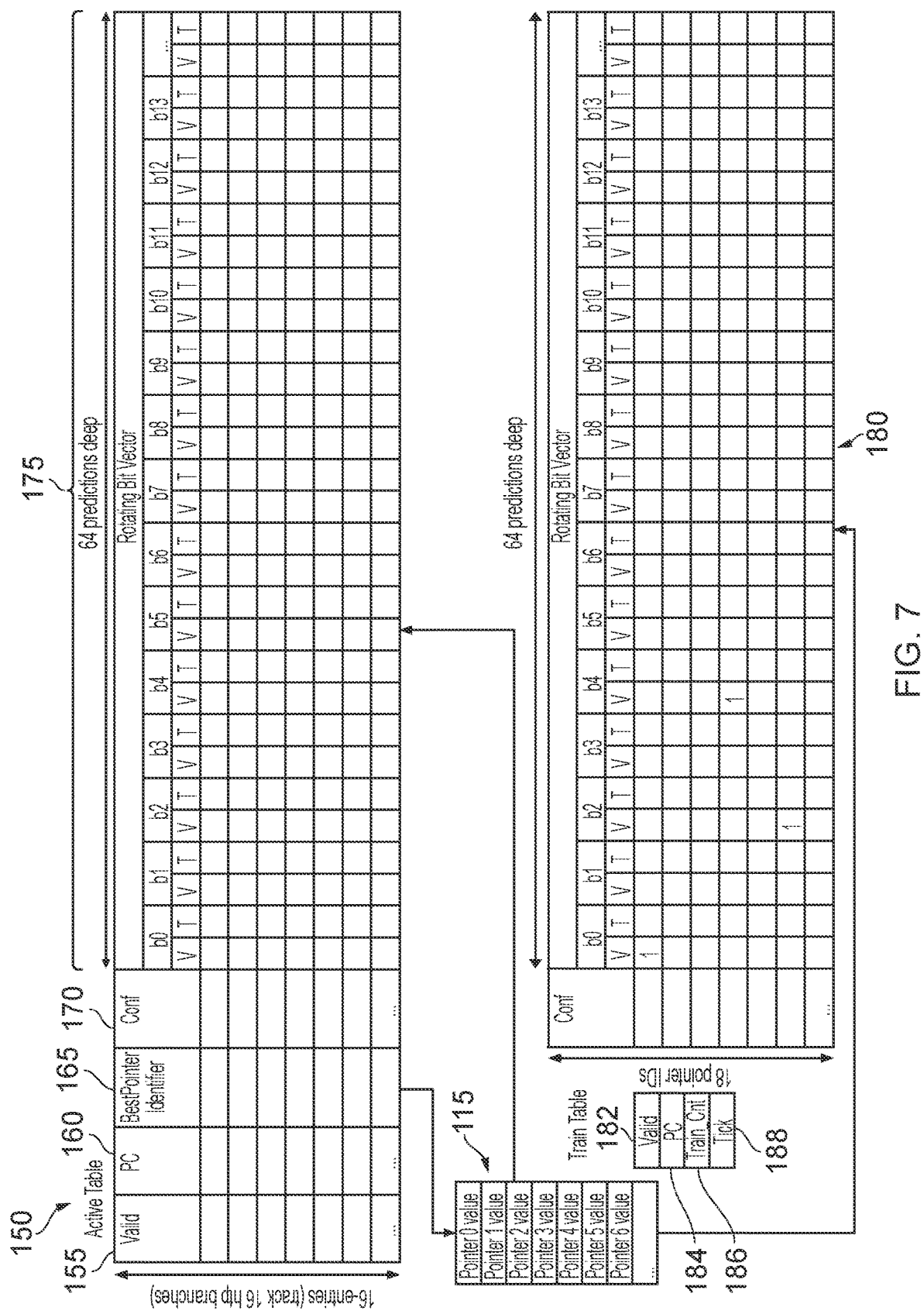
FIG. 7 schematically illustrates how training could be performed to determine pointers to associate with hard to predict (HTP) branch instructions being tracked.

One mechanism that could be used to seek to perform training within the apparatus of FIG. 6, in order to decide which pointer to use for any given control flow instruction being tracked within the history storage 105, is schematically illustrated in FIG. 7. In this example, a separate active table 150 and train table 180 is provided. The active table 150 includes a plurality of entries, where each entry is used for one HTP branch for which it is desired to make predictions. Each entry includes a valid field 155 to identify whether the entry is valid, a program counter field 160 to identify an address of the HTP branch instruction being tracked in that entry, a best pointer identifier field 165 to identify the pointer that is considered to be the best pointer for the HTP branch instruction being tracked, and a confidence indication 170 used to determine when there is sufficient confidence in the contents of the entry to enable predictions to be made using that entry. A rotating bit vector 175 is then maintained in each entry, in which to maintain the set of behaviours discussed earlier with reference to FIG. 6, populated using the pointer identified by the best pointer identifier field 165. As shown in FIG. 7, each entry in the bit vector is used to identify a taken or not taken prediction, and has a valid bit to identify whether a valid taken or not taken prediction has been stored in that entry.

The train table 180 enables, at any point in time, training to be performed for one hard to predict branch instruction being tracked in the active table. The valid field 182 is used to indicate when the contents of the train table are valid, the PC field 184 is used to identify the address of the HTP branch instruction being trained, and the train count field 186 is used to keep track of the number of training events that have taken place when training that HTP branch instruction. Separate entries in the train table are provided in order to maintain a rotating bit vector for each of the possible pointers stored in the pointer storage circuitry 115. In this particular example, it is assumed that there are 18 pointers, and hence 18 entries are provided. The rotating bit vectors take the same form as discussed earlier for the rotating bit vector 175 within the active table.

Whenever a resolved behaviour of the branch instruction for which training is being performed is received, an update process is performed for each of the entries of the train table 180 using, for each entry, the current value of the associated pointer, and if a bit vector entry pointed to by the pointer value is valid, and has a taken/not taken prediction that matches the resolved behaviour, then the confidence of that entry can be increased. Similarly, if the taken/not taken prediction does not match the resolved behaviour, then the confidence can be decreased. If there is not yet a valid bit vector entry, then that bit vector entry can be populated using the resolved behaviour. A similar update process can be performed within the active table 155 for each resolved behaviour received, and when the confidence indication indicated by the confidence indication field 170 reaches a threshold level, predictions can start to be made using the contents of the bit vector 175 for the entry containing the hard to predict branch in question.

Once a certain number of confidence updates (as indicated by the train count 186) have been made to an entry in the train table 180 for any of the pointers, then it can be determined whether the pointer having the highest confidence in the train table exceeds the confidence 170 of the current best pointer identified in the field 165 of the active table, and if so the best pointer identifier 165 and confidence indication 170 can be updated to identify the trained pointer having the highest confidence. At this point, the associated rotating bit vector 175 can also be updated to reflect the contents of the corresponding entry in the train table.

In the example illustrated in FIG. 7, a tick field 188 is provided, which can be used as a timeout in case a period of time elapses without any further training event been detected, so as to cause the current contents of the train table to be evaluated, the relevant entry in the active table to be updated if necessary, and then training to be performed for a different one of the hard to predict branch instructions being tracked in the active table.

Whilst this process can enable training to be performed for each of the hard to predict branch instructions being tracked, it suffers from a number of issues. Firstly, training can only be performed for one hard to predict branch at a time, and as a result the time taken to identify the best pointers to use for the various branch instructions being tracked can be unacceptably high. Also there are large periods of time where any given one of the branch instructions being tracked is not being trained, and hence the training may not be as accurate as desired. These problems are exacerbated if it is desired to increase the number of branch instructions being tracked.

Furthermore, in addition to the above disadvantages, if the size of the active table is increased to seek to track more hard to predict branches, then this leads to significant size/area requirements, due to the need for dedicated storage to store each of the rotating bit vectors for each of the entries.

Figure 8:
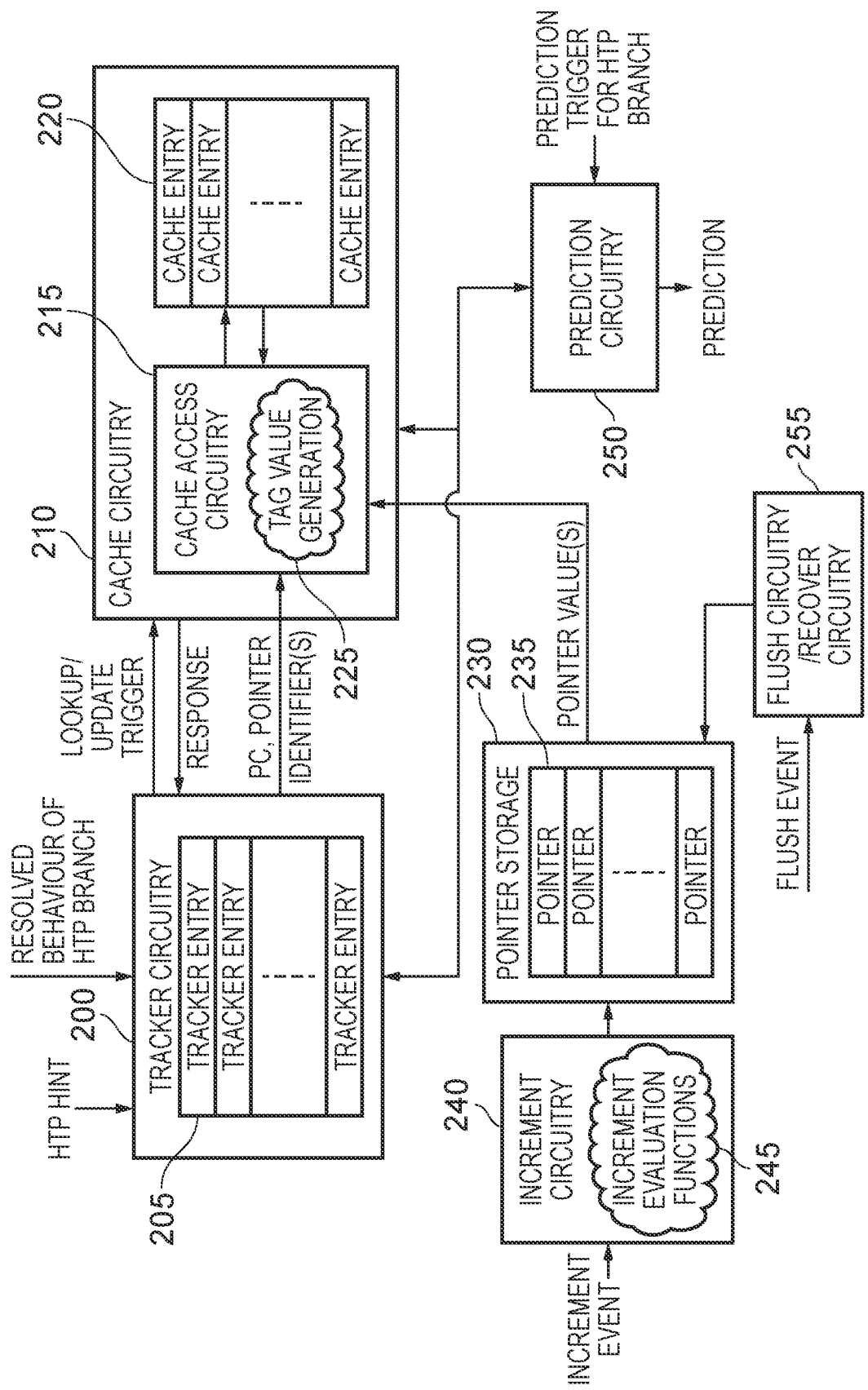
FIG. 8 schematically illustrates an example of a data processing apparatus in accordance with one example implementation.

In accordance with the techniques described herein, a mechanism is provided that seeks to alleviate the above issues, allowing a larger number of hard to predict branch instructions to be tracked in a cost/area efficient manner, and which improves the manner in which training is performed for the various hard to predict branches being tracked. An example of an apparatus in accordance with one example implementation is illustrated schematically in FIG. 8. As shown in FIG. 8, tracker circuitry 200 is provided that maintains a number of tracker entries 205. Each tracker entry can be used to identify an HTP branch instruction, a current active pointer to be associated with that instruction, and a current training pointer to be associated with that instruction. Confidence indications can also be maintained in the tracker entry for each of the active pointer and the training pointer. There are various ways in which it can be decided when to allocate any given branch instruction to an entry of the tracker circuitry 200, but in one example implementation a hard to predict hint may be provided to the tracker circuitry, for example to identify a branch instruction for which reliable prediction is not being achieved using a default prediction mechanism, for example the earlier discussed TAGE predictor.

Pointer storage 230 is provided that maintains a plurality of pointers 235, in much the same way as the earlier described pointer storage circuitry 115. However, instead of seeking to maintain bit vectors of resolved behaviours within the various tracker entries, cache circuitry 210 is provided that has a plurality of cache entries 220, where each cache entry is arranged to store a resolved behaviour of an instance of an HTP branch instruction being tracked by any of the tracker entries along with an associated tag value generated when the resolved behaviour was allocated into that cache entry. Cache access circuitry 215 is provided for maintaining the contents of the various cache entries 220, and for performing lookup operations within those cache entries as and when required. The cache access circuitry 215 includes tag value generation circuitry 225 that generates the associated tag values to be stored in association with resolved behaviours when those resolved behaviours are allocated into cache entries, and also to produce comparison tag values used when performing lookup operations.

Whenever a lookup operation needs to be performed (as for example may be the case when a resolved behaviour of an HTP branch instruction being tracked by the tracker circuitry 200 is observed, this resulting in the issuance of a lookup/update trigger to the cache circuitry 210 from the tracker circuitry 200), the cache access circuitry 215 will receive an identifier of the HTP branch instruction for which a lookup operation is required, in one example this being achieved by providing the program counter value of that HTP branch instruction from the tracker circuitry 200 to the cache access circuitry 215, and will also receive an identifier of the relevant pointer to be used when performing the lookup operation. This may be either the active pointer or the training pointer identified in the corresponding tracker entry, depending on the lookup required, and indeed in one example implementation it will typically be the case that two lookup operations will be performed, one using the active pointer and one using the training pointer. The tag value generation circuitry can then combine the received information, in combination with the pointer value of the relevant pointer as obtained from the pointer storage 230, in order to generate a tag value to be used during the lookup operation, as will be discussed in more detail later.

Depending on the outcome of such lookup operations, the contents of the various tracker entries may be updated, for instance to increment or decrement pointer confidence indications maintained for the active pointer and/or the training pointer. In addition, a training counter value may be maintained within each tracker entry, which can be incremented when a training event is determined to have occurred, in one example such a training event being determined to have occurred when either one or both of the active pointer confidence and the training pointer confidence for a given entry are updated. As will be discussed in more detail, when the training count has reached a threshold level, it can be determined whether the current training pointer is performing better than the current active pointer, and if so that training pointer can be identified as the new active pointer. Also at that point, a new training pointer can be chosen for the entry, and the training process reinitiated for that new training pointer.

By using a shared cache storage to maintain the resolved behaviours in, which is accessed in the way discussed above, this can significantly reduce the storage requirements for each individual HTP branch to be tracked, and hence can allow a significantly larger number of HTP branches to be tracked for any given area/cost provided for implementing such replay prediction. In one particular example implementation, the tracker circuitry may be arranged to maintain 256 tracker entries.

Increment circuitry 240 is provided that is responsive to increment events to apply a series of increment evaluation functions 245 to decide which pointers to increment in response to any given increment event. In one example implementation, the increment events take the form of detected backwards taken branches, such that each time a backwards taken branch is detected the increment circuitry 240 is arranged to perform the increment evaluation functions 245 in order to decide which pointers within the pointer storage 230 to increment. As discussed earlier, the evaluation functions can take a variety of different forms, but the aim is that over time the various pointers are incremented differentially with respect to each other. By way of specific example, and as noted earlier, a first pointer could have its value incremented for every backwards taken branch irrespective of the program counter value, a second pointer could be arranged never to be incremented irrespective of the program counter value, a third pointer could be incremented if a hash of all of the program counter bits is 1, a fourth pointer could be incremented if the hash of all the program counter bits is 0, etc.

When considering the above specific examples of pointers, it should be noted that the approach described in FIG. 8 where a shared cache structure is used, in addition to all the other benefits described herein, also provides a further efficiency benefit when compared with the approach shown in FIG. 7. In particular, the second pointer (i.e. the one that is never incremented irrespective of the program counter value) essentially corresponds to a last prediction direction tracker. However, the replay predictor would perform better if it used this pointer only when reusing the prediction for the same instance of a hard to predict branch from the wrong path to the new path, and not for subsequent instances of that hard to predict branch. Using the rotating buffer approach of FIG. 7, the last prediction is never cleared, so subsequent instances of that branch may use that prediction. However, when that prediction is allocated into the cache structure in the manner described herein, it will be evicted from that cache by predictions made by other branches and pointers. This ages out the prediction based on the second pointer, preventing it from being used on subsequent instances of the hard to predict branch.

Returning to FIG. 8, prediction circuitry 250 is provided that, in response to a prediction trigger in respect of a HTP branch instruction being tracked by the tracker circuitry 200, is arranged to reference the contents of the tracker circuitry 200 and the cache circuitry 210 in order to determine whether a prediction can be made of the behaviour (in this case the behaviour being whether the branch is predicted as taken or not taken) for the HTP branch instruction in question. In particular, if a lookup performed within the cache circuitry 210 using the program counter value of the HTP branch instruction, the currently active pointer and the value of that currently active pointer, results in a hit been detected, and the confidence in the currently active pointer has reached at least a threshold level, then the prediction circuitry may make a prediction using the behaviour stored in the hit entry of the cache.

As also shown in FIG. 8, flush circuitry/recover circuitry 255 can be provided to operate in much the same way as the circuitry 130 shown in FIG. 6, in response to a flush event. In one example implementation, such a flush event will occur when a misprediction is detected that causes the contents of the pipeline to be flushed and processing to resume from a previous position in the execution flow. As noted previously, the flush circuitry can be arranged to maintain the contents of the tracker circuitry and the cache circuitry during such a flush operation, and the recover circuitry can recover the relevant previous pointer values for the various pointers in response to the flush.

Figure 9:
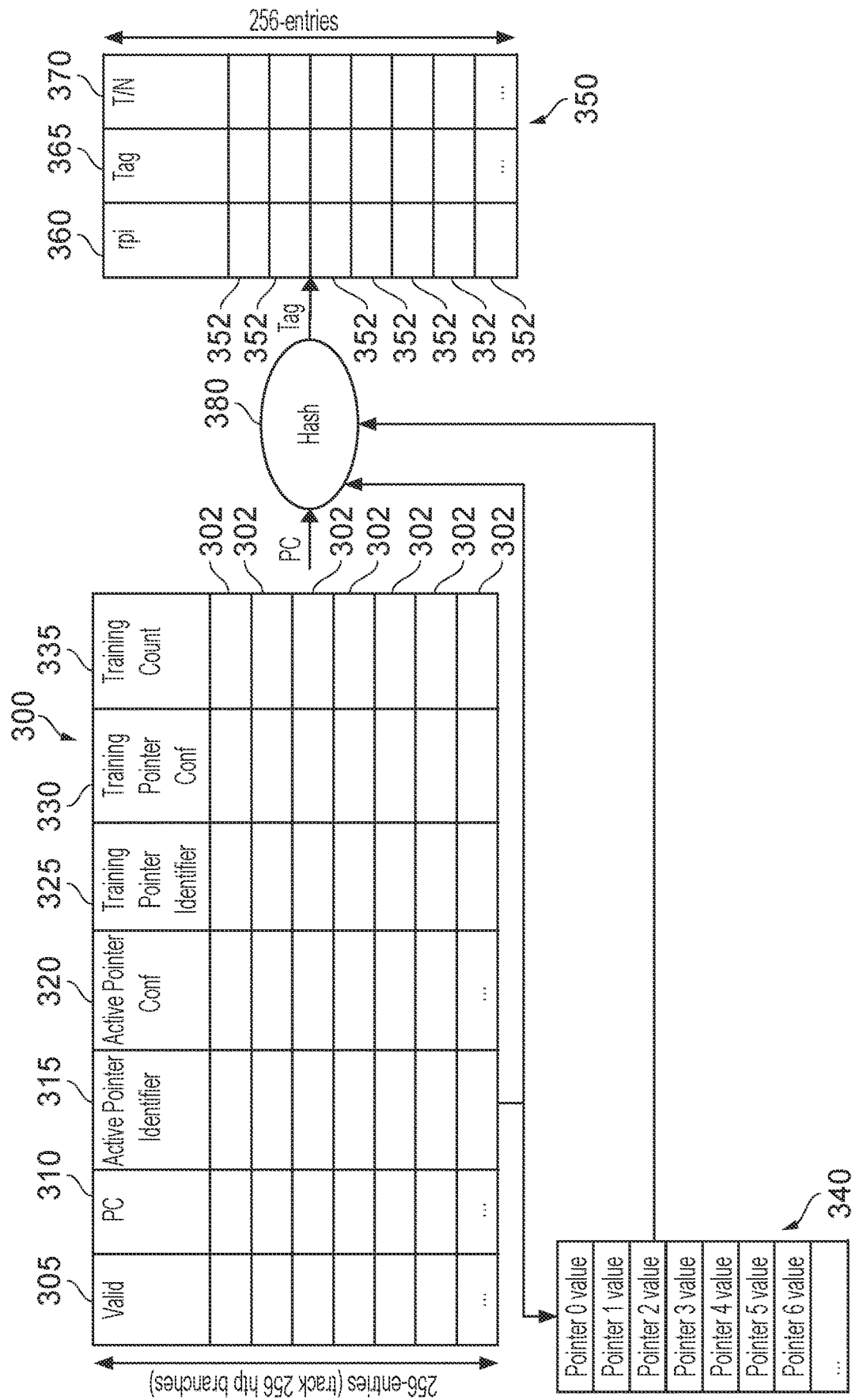
FIG. 9 illustrates how tag values may be generated in accordance with one example implementation when seeking to access the cache illustrated in FIG. 8.

FIG. 9 illustrates in more detail the contents of the tracker entries and cache entries, and the way in which tag values are generated, in accordance with one example implementation. In this example, the tracker circuitry contains tracker storage 300 providing a plurality of tracker entries 302. As shown, each tracker entry has a plurality of fields. A valid field 305 is used to identify whether the contents of the corresponding entry are valid, whilst the program counter field 310 is used to store the program counter value of the HTP branch instruction being tracked in that entry. An active pointer identifier 315 identifies one of the plurality of pointers in the pointer storage that is currently viewed to be the active pointer for the entry in question, and the associated active pointer confidence field 320 identifies a confidence indication for that active pointer. Similarly, the field 325 identifies a training pointer, again this being chosen from amongst the pointers maintained in the pointer storage 230, whilst the associated training pointer confidence field 330 provides a confidence indication for the training pointer. The training count field 335 is used to maintain a count of training events that have occurred in respect of the corresponding entry, so that when a certain threshold is reached an evaluation can be performed to determine whether the training pointer is performing better than the active pointer.

As shown in FIG. 9, the cache circuitry 210 may maintain a cache storage 350 containing a plurality of cache entries 352. Each cache entry can be used to store a tag value 365 generated by the tag value generation circuitry 225 when that cache entry was populated, and can also store an associated resolved behaviour in the field 370, in this case the taken/not taken behaviour. As also shown in FIG. 9, if desired, a field 360 can be used to store replacement policy information (rpi) referenced by the cache circuitry when selecting a victim cache entry whose current contents are to be overwritten to make space for allocation of new content.

The tag value generation circuitry 225 can take a variety of forms, but in the example of FIG. 9 implements a hash function 380 using as inputs the program counter value of the HTP branch instruction in question, the active pointer identifier associated with that HTP branch instruction in the relevant tracker entry, and the current pointer value of that active pointer as obtained from the pointer storage 340 (this corresponding to the pointer storage 230 shown in FIG. 8). By performing a hash operation using these three pieces of information, it will be appreciated that the tag value generated will be dependent on the current active pointer, and the value of that active pointer at the time the tag value is generated.

The cache storage 350 can be organised in a variety of ways, and hence for example could take the form of a fully associative cache or a set associative cache. In one particular example implementation it is assumed that the cache storage is a fully associative cache, and accordingly all entries are referenced when performing a lookup operation, as any given content can be allocated in any available entry within the cache.

Figure 10:
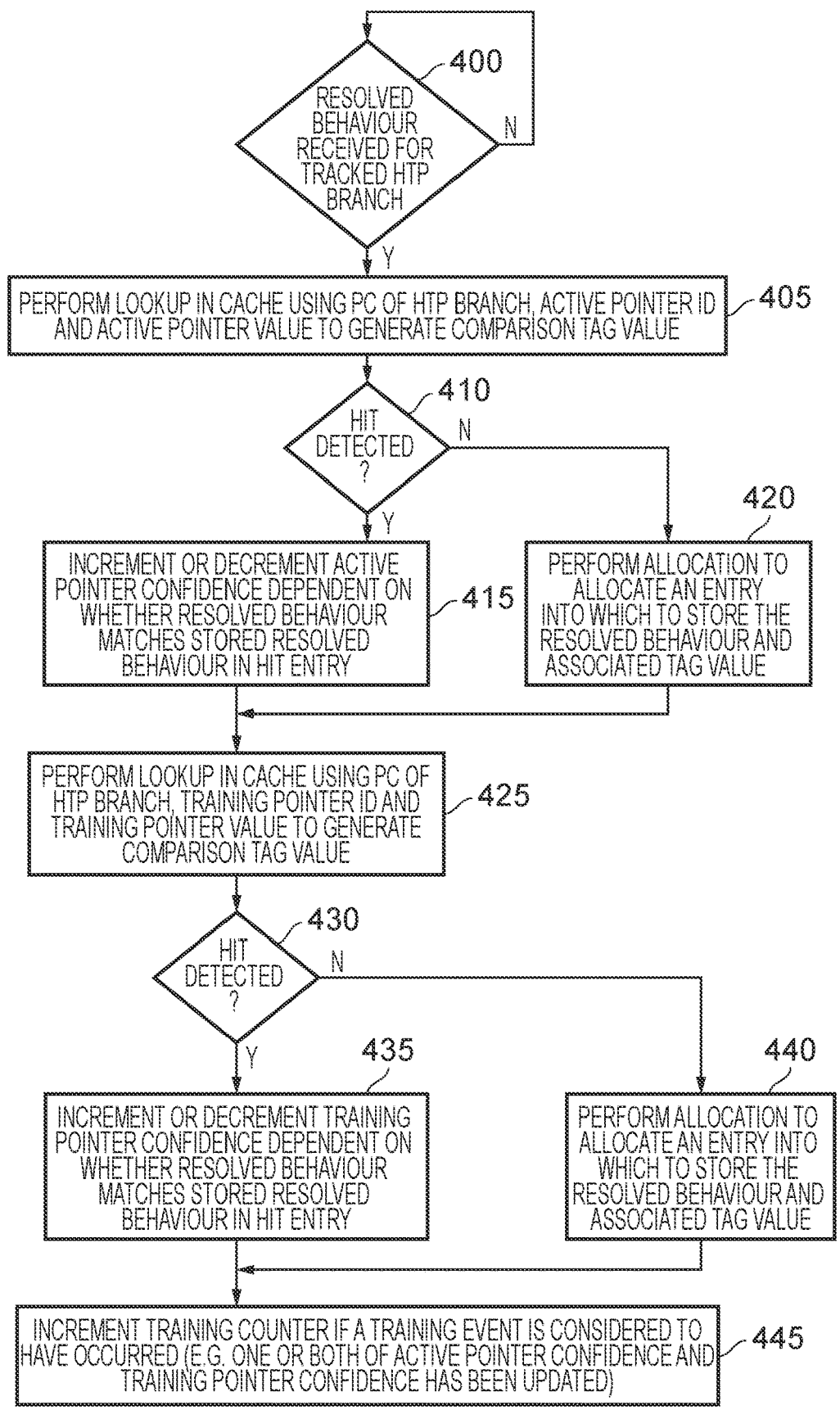
FIG. 10 is a flow diagram illustrating steps performed by the apparatus of FIG. 8 upon receiving an indication of resolved behaviour for a tracked HTP branch instruction, in accordance with one example implementation.

FIG. 10 is a flow diagram illustrating steps performed by the apparatus of FIG. 8 when a resolved behaviour is received for an HTP branch instruction being tracked within the tracker circuitry 200. When such a resolved behaviour is detected at step 400, then at step 405 a lookup is performed in the cache of the cache circuitry 210 using a comparison tag value that is generated using the program counter value of the HTP branch instruction in question, the active pointer identifier for that HTP branch as identified by the tracker entry, and the pointer value of that active pointer.

It is then determined at step 410 whether a hit has been detected in one of the cache entries (i.e. whether the comparison tag value matches the stored tag value in that entry), and if so the process proceeds to step 415 where the active pointer confidence in the relevant tracker entry may be incremented or decremented dependent on whether the resolved behaviour matches the stored resolved behaviour in the hit entry. For example, in one particular implementation the active pointer confidence is incremented if the resolved behaviour matches the stored resolved behaviour, and is otherwise decremented. However, if desired, this increment/decrement functionality can be made dependent on other criteria. For example, it may be determined in one example implementation to inhibit update of the confidence indication if the predicted behaviour stored in the hit entry matches the prediction that would have been made using a default prediction mechanism, such as the earlier described TAGE predictor.

If a hit is not detected at step 410, then in one example implementation an allocation is performed within the cache, in order to allocate an entry into which to store the resolved behaviour and the associated tag value. The earlier discussed replacement policy information can be referenced by the cache circuitry when determining a victim entry into which to allocate this new information. In one example implementation, when performing such an allocation, no update is made to the active confidence indication being maintained in the relevant tracker entry.

As also shown in FIG. 10, in addition to performing a lookup using the active pointer, a lookup is also performed using the training pointer. Hence, at step 425, a comparison tag value is generated using the program counter of the HTP branch instruction, the training pointer identifier stored in the relevant tracker entry, and the current pointer value of that training pointer, and a lookup is performed in the cache using that comparison tag value. At step 430 it is determined whether a hit has been detected, and if so then at step 435 the training pointer confidence may be incremented or decremented dependent on whether the resolved behaviour matches the stored resolved behaviour in the hit entry, in much the same way as the active pointer confidence is incremented or decremented as discussed earlier with reference to step 415.

Again, this functionality can be inhibited in certain situations if desired, for example if the predicted behaviour stored in the hit entry matches the prediction that would be made by a default prediction mechanism. Further, in one example implementation, if only one of the two lookup operations performed at steps 405 and 425 results in the associated confidence indication needing to be incremented, and that associated confidence indication is already at a saturated level, then instead the other confidence indication can be decremented (so by way of specific example, if it was determined that the active pointer confidence needed incrementing but the training pointer confidence did not, and the active pointer confidence was already at a saturated level, it may be determined instead to decrement the training pointer confidence).

If a miss is detected at step 430, then at step 440 an entry can be allocated into which to store the resolved behaviour and the associated tag value, in much the same way as an allocation may be performed as discussed earlier at step 420 when performing the lookup using the active pointer.

Irrespective of which of steps 435 or 440 are performed, at step 445 the training counter is incremented if a training event is considered to have occurred. In one example implementation, such a training event will be considered to have occurred if one or both of the active pointer confidence and the training pointer confidence has been updated as a result of the process described with reference to FIG. 10.

Figure 11:
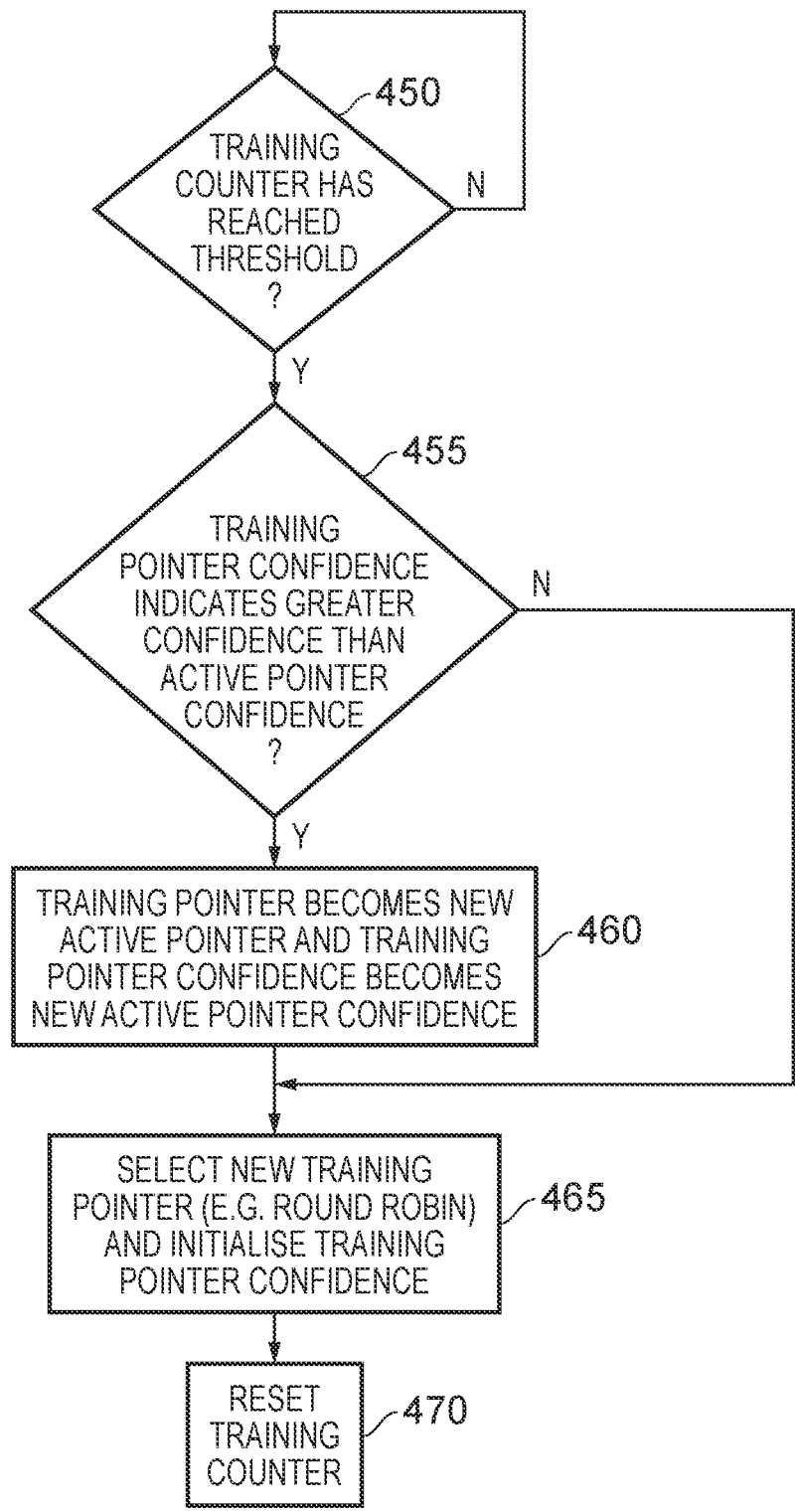
FIG. 11 is a flow diagram illustrating steps performed by the apparatus of FIG. 8 upon determining that a training counter has reached a determined threshold, in accordance with one example implementation.

FIG. 11 is a flow diagram illustrating steps taken in one example implementation when the training counter of a given tracker entry has reached a threshold level. Any suitable threshold level can be chosen, but in one particular example implementation the threshold level is determined to have been reached when 32 training events have been detected. When this is detected at step 450, it is then determined at step 455 whether the training pointer confidence indicates a greater confidence than the active pointer confidence, for the tracker entry in question. If so, then the training pointer becomes the new active pointer at step 460, and similarly the training pointer confidence becomes the new active pointer confidence. Thereafter, at step 465, or directly following step 455 if it is determined that the training pointer confidence is not greater than the active pointer confidence, a new training pointer is selected and the training pointer confidence is initialised for that newly selected training pointer. There are various ways in which the new training pointer can be selected, but the aim is to cycle through all of the possible pointers over time in order to decide which one performs best for any given HTP branch instruction being tracked, and hence in one example implementation the new training pointer can be selected in a round robin manner, by cycling through the pointers maintained within the pointer storage 340. At step 470, the training counter is then reset, so as to reinitiate the above described training process.

It should be noted that by adopting the above described approach, each of the tracker entries is trained at its own rate, depending on the frequency at which the HTP branch instruction being tracked in that tracker entry is encountered, and hence allows training to be performed more quickly for the more commonly appearing HTP branch instructions. This can significantly improve performance, since the more frequently appearing HTP branch instructions are the ones that will give rise to the best incremental performance improvement if they are predicted correctly.

Figure 12:
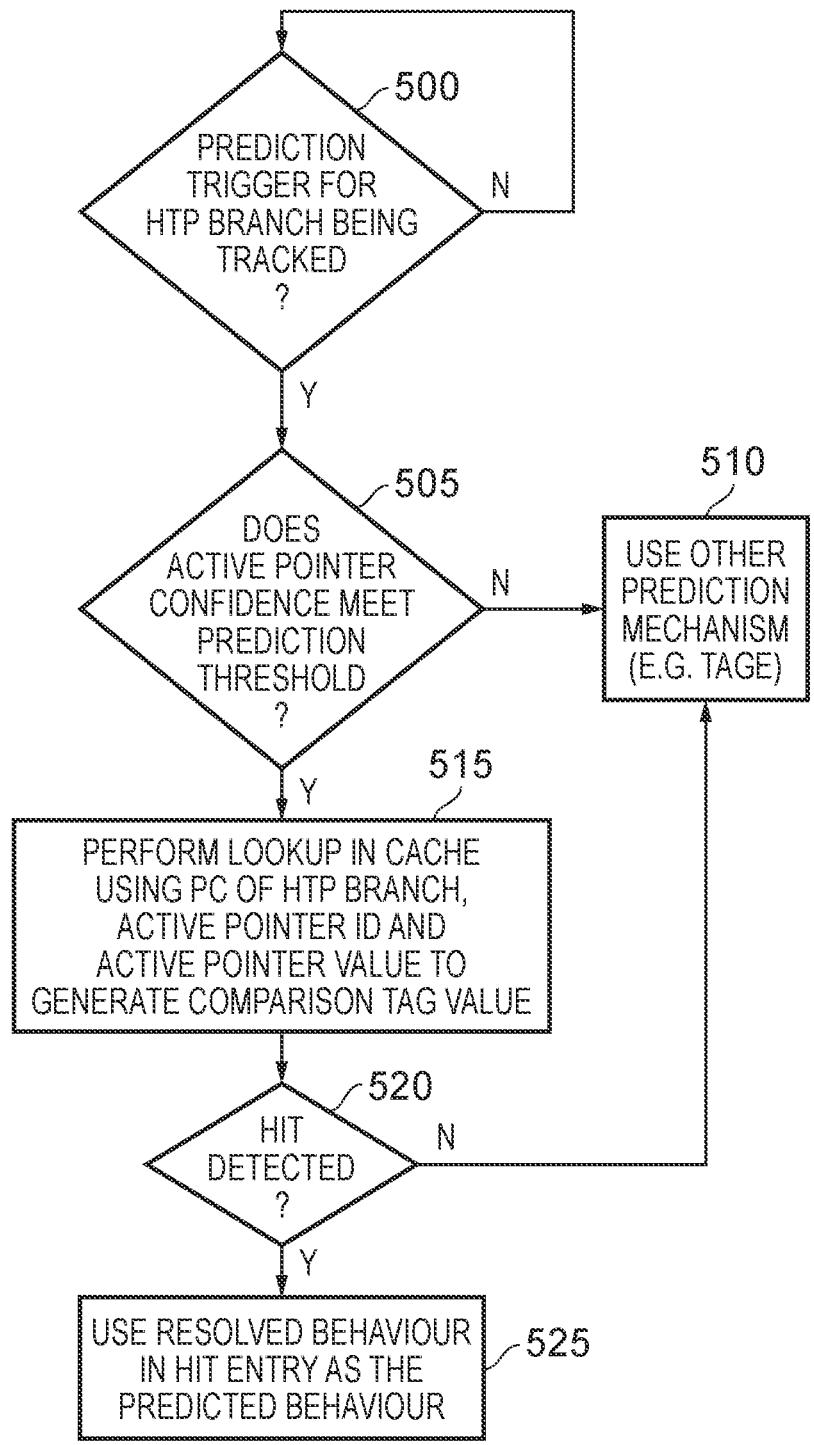
FIG. 12 is a flow diagram illustrating steps performed by the apparatus of FIG. 8 upon receipt of a prediction trigger for a tracked HTP branch instruction, in accordance with one example implementation.

FIG. 12 is a flow diagram illustrating steps taken by the apparatus of FIG. 8 upon receipt of a prediction trigger for a HTP branch instruction being tracked within the tracker circuitry. When such a prediction trigger is received (for example due to a tracked HTP branch instruction being detected in the instruction flow), it is determined at step 505 whether the active pointer confidence indicated in the relevant tracker entry meets a determined prediction threshold, and if not then at step 510 a different prediction mechanism is used to make the prediction, for example the earlier discussed TAGE predictor.

However, if the active pointer confidence does meet a specified prediction threshold, then at step 515 a lookup is performed in the cache using a comparison tag value generated using the program counter of the HTP branch instruction in question, the active pointer identifier as identified by the relevant tracker entry, and the current value of the active pointer. It is then determined at step 520 whether a hit has been detected, and if not then the process proceeds to step 510 where another prediction mechanism is used as discussed earlier. However, if a hit is detected, then the resolved behaviour as stored in the hit entry is used as the predicted behaviour at step 525.

It has been found that the above described techniques can provide for significantly improved prediction performance for a variety of HTP branch instructions than would be achieved by using other prediction mechanisms. However, it may still be the case that there are certain HTP branch instructions for which it is difficult to obtain accurate predictions. For example, some HTP branch instructions may be provided within a software function that is called from multiple different places within program code, and the behaviour of that HTP branch instruction may depend upon where that function is called from within the program code. As a result, the correlation that is seeking to be determined using the above described technique may be difficult to realise due to the behaviour of that HTP branch instruction varying in such a way.

Figure 13:
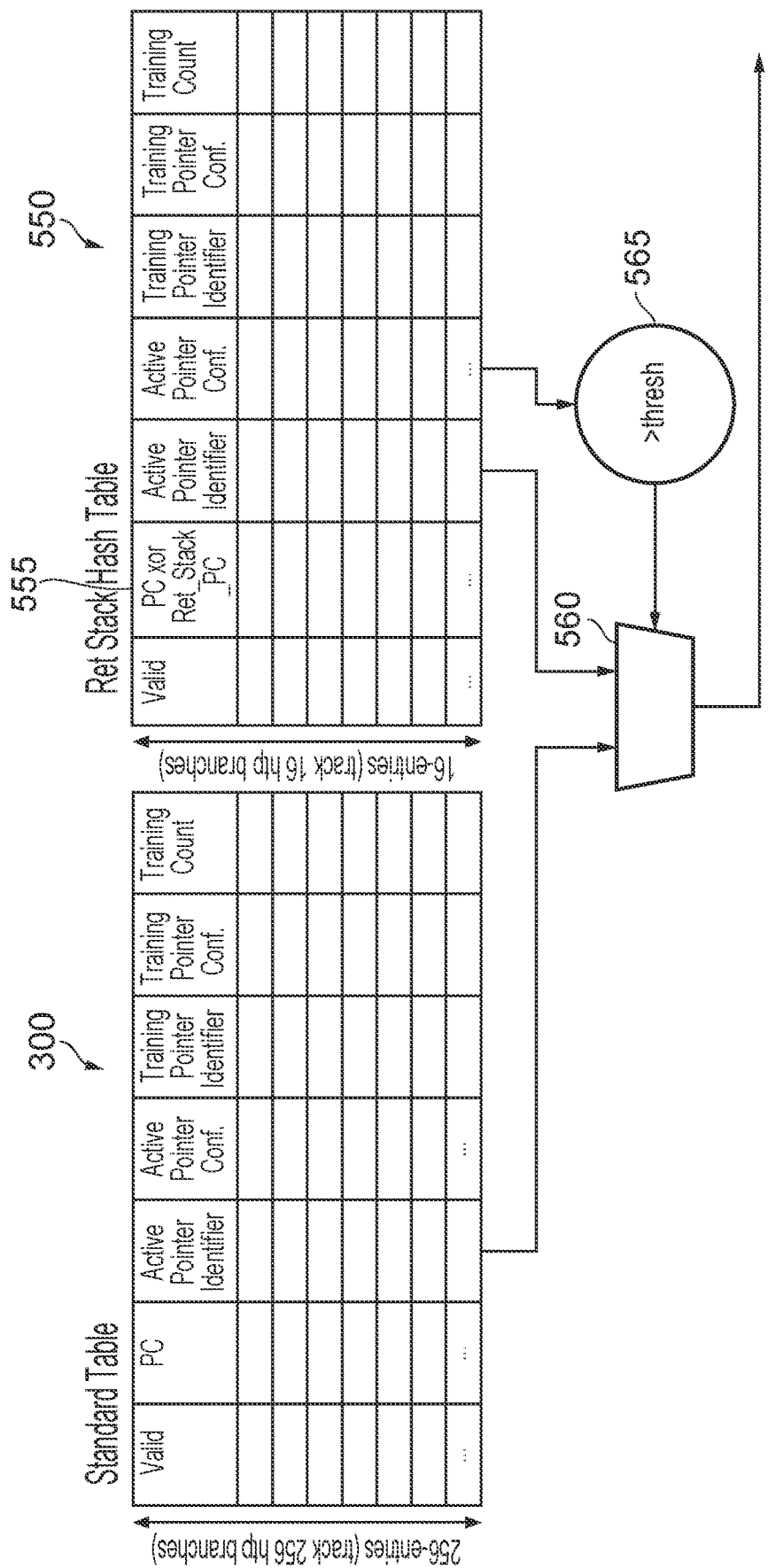
FIG. 13 is a diagram schematically illustrating the use of an additional tracker table for hard to predict branch instructions, in accordance with one example implementation.

In order to seek to improve the prediction accuracy for such HTP branch instructions, then in one example implementation the tracker circuitry may be arranged to maintain a plurality of additional tracker entries, as illustrated schematically in FIG. 13. As shown, in addition to the standard tracker table 300, which may take the form discussed earlier with reference to FIG. 9, an additional table 550 may be provided, referred to in FIG. 13 as a return stack hash table. As will be seen, the return stack hash table 550 contains a number of entries that essentially have the same fields as the entries in the standard table. However, instead of merely storing the program counter of the HTP branch instruction being tracked, as can be seen by the field 555 of an entry in the return stack hash table 550, that program counter value is XORed with a return stack program counter value identifying where within the program code execution will return to once the function containing the HTP branch instruction in question has completed. Hence, the address indication captured within the field 555 is influenced by where within the program code the function containing the HTP branch instruction in question was called from.

The entries in the return stack hash table 550 can be used and trained in much the same way as the entries in the standard table 300, with both of these tracker tables making use of the cache storage maintained by the cache circuitry 210. The only difference is that when the tag value generation circuitry performs the tag generation process, it will use the contents of the field 555 as the address indication, and as noted above those contents are formed by combining the program counter of the HTP branch instruction in question with a return stack program counter value.

How many entries are provided within the return stack hash table 550 is a matter of design choice, but in one example implementation it may be the case that there are significantly fewer entries in the return stack hash table 550 than in the standard table 300. In the particular example illustrated in FIG. 13, there are 256 entries in the standard table 300, but only 16 entries in the return stack hash table 550. In this example implementation, it is assumed that an entry is only made within the return stack hash table 550 if a threshold level of prediction accuracy is not being achieved using the corresponding entry in the standard table 300.

When an entry is made in the return stack hash table 550, then in one example implementation the corresponding entry in the standard table may be invalidated. However, in an alternative implementation, both entries may be maintained, so that either can be used for prediction dependent on prediction accuracy achieved. In the particular example shown in FIG. 13, a threshold detection circuitry 565 may be used to determine when the active pointer confidence of the corresponding entry in the return stack hash table 550 reaches or exceeds a threshold level, at which point the prediction circuitry may switch (as indicated schematically by the multiplexer 560) from using the contents of the relevant tracker entry in the standard table when performing a lookup within the cache to obtain the predicted behaviour, and instead may use the contents of the corresponding entry in the return stack hash table to perform such lookup operations in order to obtain the predicted behaviour.

Figure 14:
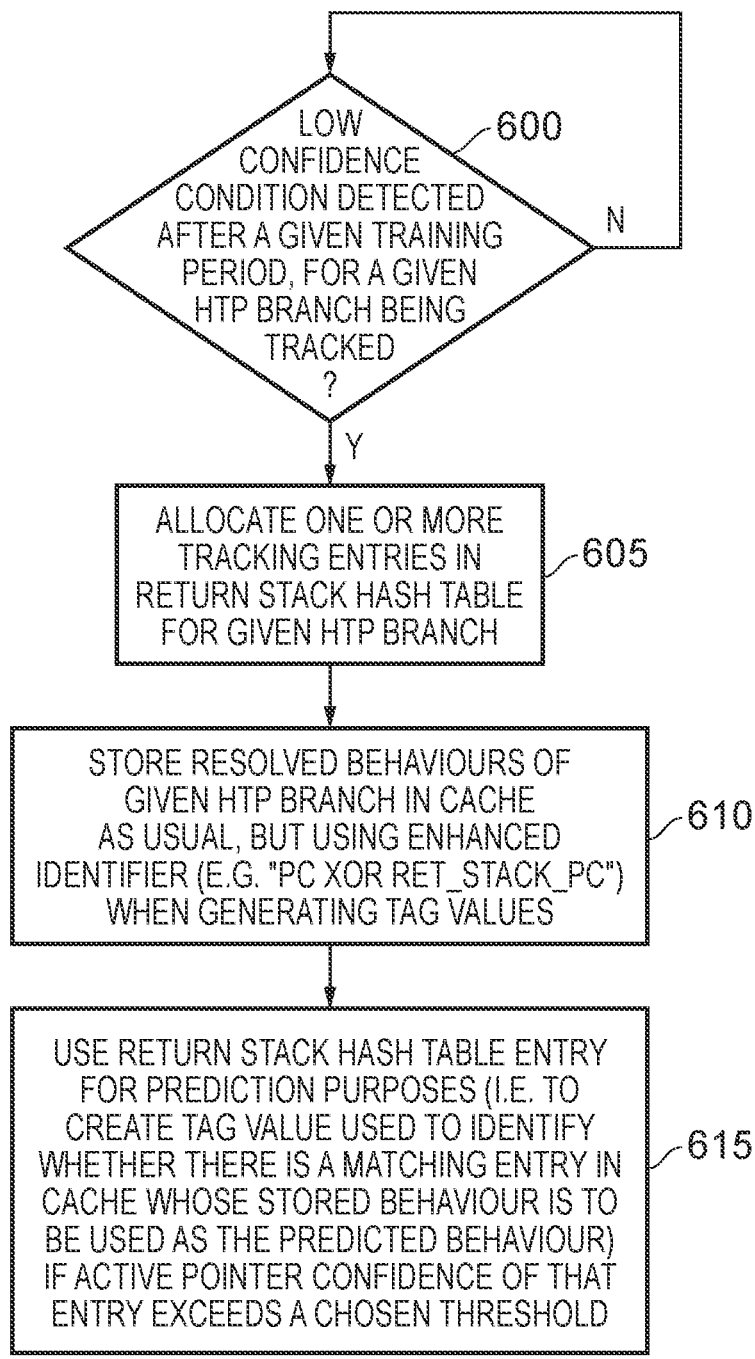
FIG. 14 is a flow diagram illustrating how the additional tracker table of FIG. 13 may be utilised, in accordance with one example implementation.

FIG. 14 is a flow diagram illustrating one way in which the technique illustrated in FIG. 13 may be used. At step 600, it is determined whether a low confidence condition has been detected after a given training period, for a given HTP branch instruction being tracked by a tracker entry in the standard table 300. That training period can be chosen as desired, but by way of example may involve at least one training iteration through all of the pointers, with the best performing of those pointers then being reflected as the current active pointer in the tracker entry of the standard table. If after that process a certain level of mispredictions still occurs when predicting the behaviour of the given HTP branch instruction, this may be treated as elapse of the above-mentioned training period and cause an additional tracker entry to be allocated for that given HTP branch instruction within the return stack hash table 550, with the training process then being performed for that additional tracker entry.

Hence, as shown in FIG. 14, if such a low confidence condition is detected after a given training period, then at step 605 one or more tracking entries are allocated in the return stack hash table for the given HTP branch instruction, and thereafter, at step 610, resolved behaviours of the given HTP branch instruction are stored in the cache as usual, but using the enhanced address identifier referred to earlier when generating tag values, which in one example implementation is achieved by XORing the program counter of the hard to predict branch instruction with the program counter value on a return stack. If the corresponding tracker entry in the standard table is still being used in parallel, then the resolved behaviours can also cause updates to be made using the contents of the entry in the standard table, as discussed earlier.

At step 615, the return stack hash table entry can be used for prediction purposes if the active pointer confidence of that entry exceeds a chosen threshold. This can be achieved by creating a tag value using the contents of the field 555 of the relevant entry in the return stack hash table, in combination with the active pointer identifier and the current value of the active pointer, in order to create a comparison tag value used to determine whether there is a matching entry in the cache, and if so the stored behaviour in that matching entry can be used as the predicted behaviour.

Concepts described herein may be embodied in computer-readable code for fabrication of an apparatus that embodies the described concepts. For example, the computer-readable code can be used at one or more stages of a semiconductor design and fabrication process, including an electronic design automation (EDA) stage, to fabricate an integrated circuit comprising the apparatus embodying the concepts. The above computer-readable code may additionally or alternatively enable the definition, modelling, simulation, verification and/or testing of an apparatus embodying the concepts described herein.

For example, the computer-readable code for fabrication of an apparatus embodying the concepts described herein can be embodied in code defining a hardware description language (HDL) representation of the concepts. For example, the code may define a register-transfer-level (RTL) abstraction of one or more logic circuits for defining an apparatus embodying the concepts. The code may define a HDL representation of the one or more logic circuits embodying the apparatus in Verilog, SystemVerilog, Chisel, or VHDL (Very High-Speed Integrated Circuit Hardware Description Language) as well as intermediate representations such as FIRRTL. Computer-readable code may provide definitions embodying the concept using system-level modelling languages such as SystemC and SystemVerilog or other behavioural representations of the concepts that can be interpreted by a computer to enable simulation, functional and/or formal verification, and testing of the concepts.

Additionally or alternatively, the computer-readable code may define a low-level description of integrated circuit components that embody concepts described herein, such as one or more netlists or integrated circuit layout definitions, including representations such as GDSII. The one or more netlists or other computer-readable representation of integrated circuit components may be generated by applying one or more logic synthesis processes to an RTL representation to generate definitions for use in fabrication of an apparatus embodying the invention. Alternatively or additionally, the one or more logic synthesis processes can generate from the computer-readable code a bitstream to be loaded into a field programmable gate array (FPGA) to configure the FPGA to embody the described concepts. The FPGA may be deployed for the purposes of verification and test of the concepts prior to fabrication in an integrated circuit or the FPGA may be deployed in a product directly.

The computer-readable code may comprise a mix of code representations for fabrication of an apparatus, for example including a mix of one or more of an RTL representation, a netlist representation, or another computer-readable definition to be used in a semiconductor design and fabrication process to fabricate an apparatus embodying the invention. Alternatively or additionally, the concept may be defined in a combination of a computer-readable definition to be used in a semiconductor design and fabrication process to fabricate an apparatus and computer-readable code defining instructions which are to be executed by the defined apparatus once fabricated.

Such computer-readable code can be disposed in any known transitory computer-readable medium (such as wired or wireless transmission of code over a network) or non-transitory computer-readable medium such as semiconductor, magnetic disk, or optical disc. An integrated circuit fabricated using the computer-readable code may comprise components such as one or more of a central processing unit, graphics processing unit, neural processing unit, digital signal processor or other components that individually or collectively embody the concept.

Concepts described herein may be embodied in a system comprising at least one packaged chip. The apparatus described earlier is implemented in the at least one packaged chip (either being implemented in one specific chip of the system, or distributed over more than one packaged chip). The at least one packaged chip is assembled on a board with at least one system component. A chip-containing product may comprise the system assembled on a further board with at least one other product component. The system or the chip-containing product may be assembled into a housing or onto a structural support (such as a frame or blade).

Figure 15:
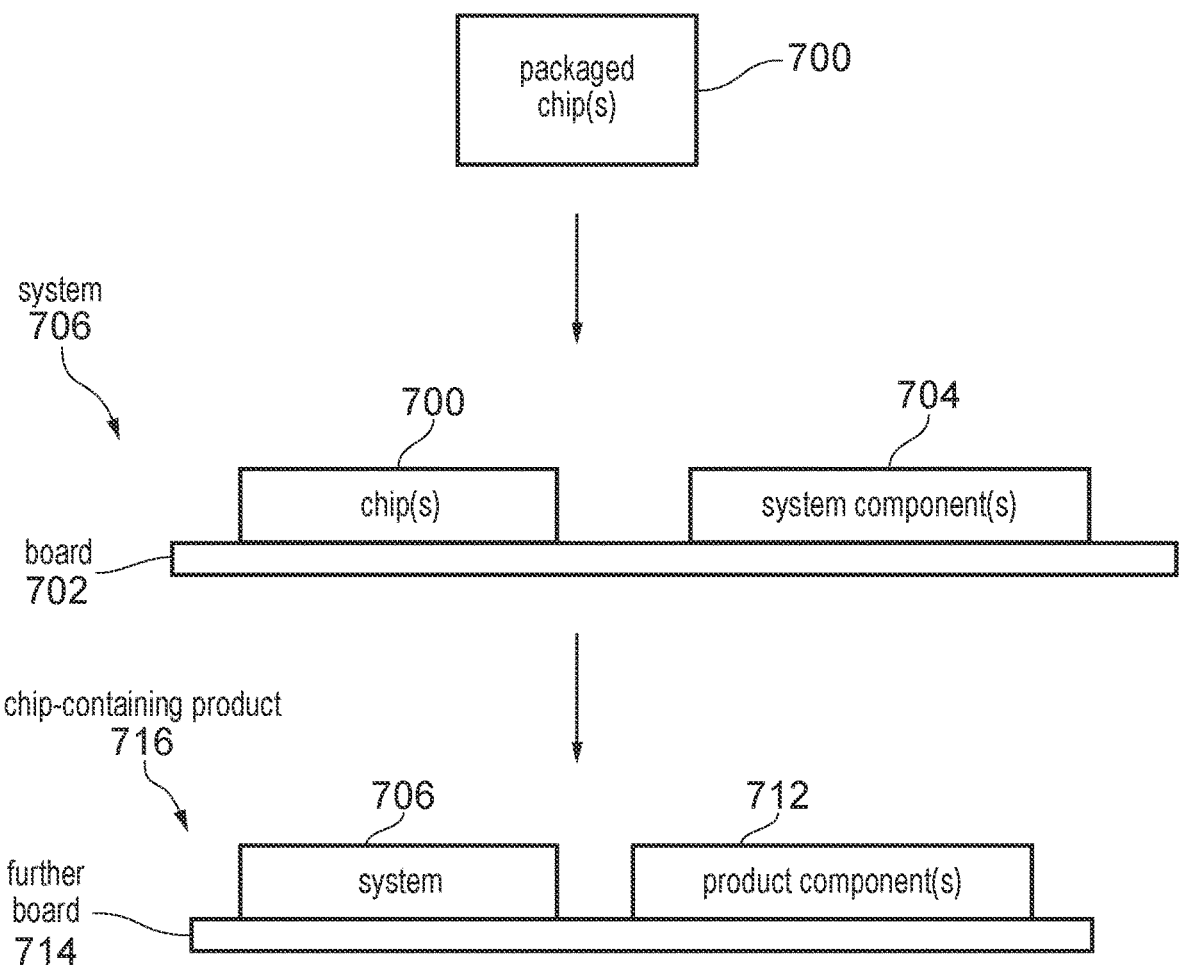
FIG. 15 illustrates an example of a system and chip-containing product.

As shown in FIG. 15 one or more packaged chips 700, with the apparatus described above implemented on one chip or distributed over two or more of the chips, are manufactured by a semiconductor chip manufacturer. In some examples, the chip product 700 made by the semiconductor chip manufacturer may be provided as a semiconductor package which comprises a protective casing (e.g. made of metal, plastic, glass or ceramic) containing the semiconductor devices implementing the apparatus described above and connectors, such as lands, balls or pins, for connecting the semiconductor devices to an external environment. Where more than one chip 700 is provided, these could be provided as separate integrated circuits (provided as separate packages), or could be packaged by the semiconductor provider into a multi-chip semiconductor package (e.g. using an interposer, or by using three-dimensional integration to provide a multi-layer chip product comprising two or more vertically stacked integrated circuit layers).

In some examples, a collection of chiplets (i.e. small modular chips with particular functionality) may itself be referred to as a chip. A chiplet may be packaged individually in a semiconductor package and/or together with other chiplets into a multi-chiplet semiconductor package (e.g. using an interposer, or by using three-dimensional integration to provide a multi-layer chiplet product comprising two or more vertically stacked integrated circuit layers).

The one or more packaged chips 700 are assembled on a board 702 together with at least one system component 704. For example, the board may comprise a printed circuit board. The board substrate may be made of any of a variety of materials, e.g. plastic, glass, ceramic, or a flexible substrate material such as paper, plastic or textile material. The at least one system component 704 comprise one or more external components which are not part of the one or more packaged chip(s) 700. For example, the at least one system component 704 could include, for example, any one or more of the following: another packaged chip (e.g. provided by a different manufacturer or produced on a different process node), an interface module, a resistor, a capacitor, an inductor, a transformer, a diode, a transistor and/or a sensor.

A chip-containing product 716 is manufactured comprising the system 706 (including the board 702, the one or more chips 700 and the at least one system component 704) and one or more product components 712. The product components 712 comprise one or more further components which are not part of the system 706. As a non-exhaustive list of examples, the one or more product components 712 could include a user input/output device such as a keypad, touch screen, microphone, loudspeaker, display screen, haptic device, etc.; a wireless communication transmitter/receiver; a sensor; an actuator for actuating mechanical motion; a thermal control device; a further packaged chip; an interface module; a resistor; a capacitor; an inductor; a transformer; a diode; and/or a transistor. The system 706 and one or more product components 712 may be assembled on to a further board 714.

The board 702 or the further board 714 may be provided on or within a device housing or other structural support (e.g. a frame or blade) to provide a product which can be handled by a user and/or is intended for operational use by a person or company.

The system 706 or the chip-containing product 716 may be at least one of: an end-user product, a machine, a medical device, a computing or telecommunications infrastructure product, or an automation control system. For example, as a non-exhaustive list of examples, the chip-containing product could be any of the following: a telecommunications device, a mobile phone, a tablet, a laptop, a computer, a server (e.g. a rack server or blade server), an infrastructure device, networking equipment, a vehicle or other automotive product, industrial machinery, consumer device, smart card, credit card, smart glasses, avionics device, robotics device, camera, television, smart television, DVD players, set top box, wearable device, domestic appliance, smart meter, medical device, heating/lighting control device, sensor, and/or a control system for controlling public infrastructure equipment such as smart motorway or traffic lights.

Some example configurations are set out in the following numbered clauses:

1. An apparatus comprising:
   pointer storage to store pointer values for a plurality of pointers;
   increment circuitry, responsive to a series of increment events, to differentially increment the pointer values of the pointers;
   tracker circuitry to maintain a plurality of tracker entries, each tracker entry to identify a control flow instruction and a current active pointer to be associated with that control flow instruction, where the current active pointer is selected from amongst the plurality of pointers;
   cache circuitry to maintain a plurality of cache entries, each cache entry to store a resolved behaviour of an instance of a control flow instruction identified by a tracker entry of the tracker circuitry along with an associated tag value generated when the resolved behaviour was allocated into that cache entry, and for each entry in at least a subset of the entries the associated tag value is generated in dependence on an address indication of the control flow instruction whose resolved behaviour is being stored in that entry and the current active pointer associated with that control flow instruction; and
   prediction circuitry, responsive to a prediction trigger associated with a replay of a given instance of a given control flow instruction identified by a tracker entry of the tracker circuitry, to cause a lookup operation to be performed by the cache circuitry using a comparison tag value generated in dependence on the address indication of the given control flow instruction and the current active pointer, and in the event of a hit being detected in a given cache entry, to use the resolved behaviour stored in the given cache entry as the predicted behaviour of the given instance of the given control flow instruction, provided a prediction confidence metric is met.

2. An apparatus as in Clause 1, wherein:
   each tracker entry further provides an active pointer confidence indication for the current active pointer;
   each time a resolved behaviour is provided for the given control flow instruction, the cache circuitry is arranged to perform a lookup operation using the comparison tag value, and in the event of the comparison tag value matching the associated tag value stored in an accessed entry of the plurality of cache entries, the tracker circuitry is arranged to update the active pointer confidence indication in the tracker entry for the given control flow instruction in dependence on whether the provided resolved behaviour matches the resolved behaviour stored in the accessed entry; and
   the prediction circuitry is arranged to reference the active pointer confidence indication as stored in the tracker entry when determining whether the prediction confidence metric is met.

3. An apparatus as in Clause 2, wherein the tracker circuitry is arranged to update the active pointer confidence indication in the tracker entry for the given control flow instruction to indicate an enhanced confidence when the provided resolved behaviour matches the resolved behaviour stored in the accessed entry, and to otherwise update the active pointer confidence indication in the tracker entry for the given control flow instruction to indicate a decreased confidence.

4. An apparatus as in Clause 3, wherein the tracker circuitry is arranged to inhibit update of the active pointer confidence indication in the tracker entry for the given control flow instruction when the resolved behaviour stored in the accessed entry indicates the same behaviour as would be predicted by a reference prediction mechanism.

5. An apparatus as in any preceding clause, further comprising:
tag value generation circuitry to apply a tag value generation function to generate the associated tag values stored in cache entries and the comparison tag values used in lookup operations, the tag value generation function using as inputs an address indication of a selected control flow instruction and pointer information of a pointer to be associated with that selected control flow instruction.

6. An apparatus as in Clause 5, wherein the pointer information comprises a pointer indication to identify the pointer and the pointer value of the identified pointer.

7. An apparatus as in any preceding clause when dependent on Clause 2, wherein: each tracker entry further identifies a current training pointer to be associated with the control flow instruction identified by that tracker entry and a training pointer confidence indication for the current training pointer, where the current training pointer is selected from amongst the plurality of pointers;
each time the resolved behaviour is provided for the given control flow instruction, the cache circuitry is arranged to perform a further lookup operation using a further comparison tag value generated in dependence on the address indication of the given control flow instruction and the current training pointer, and in the event of the further comparison tag value matching the associated tag value stored in a further accessed entry of the plurality of cache entries accessed during the further lookup operation, the tracker circuitry is arranged to update the training pointer confidence indication in the tracker entry for the given control flow instruction in dependence on whether the provided resolved behaviour matches the resolved behaviour stored in the further accessed entry.

8. An apparatus as in Clause 7, wherein:
each tracker entry further identifies a training counter which is incremented in response to each occurrence of a training event;
the tracker circuitry is responsive to the training counter reaching a determined threshold for a given tracker entry, to determine whether the training pointer confidence indication indicates a greater confidence than is indicated by the active pointer confidence indication, and in that event to update the given tracker entry to identify the current training pointer as being the current active pointer, and to select another pointer from the plurality of pointers as a new current training pointer.

9. An apparatus as in Clause 8, wherein:
when the training pointer confidence indication indicates a greater confidence than is indicated by the active pointer confidence indication, the tracker circuitry is further arranged to update the given tracker entry to identify the current training pointer confidence indication as being the active pointer training indication, to reset the training pointer confidence indication for the new current training pointer, and to reset the training counter.

10. An apparatus as in Clause 8 or Clause 9, wherein the selection of the new current training pointer is made according to a selection algorithm that seeks to allow all pointers to be used as training pointers over time.

11. An apparatus as in any of clauses 8 to 10, wherein the training event is determined to occur whenever an update is made to at least one of the active pointer confidence indication and the training pointer confidence indication of the associated tracker entry.

12. An apparatus as in any preceding clause, wherein the increment event is a backwards taken branch.

13. An apparatus as in any preceding clause, wherein the resolved behaviour stored in a given cache entry is a branch direction outcome of an instance of a control flow instruction identified by a tracker entry of the tracker circuitry.

14. An apparatus as in any preceding clause, wherein the increment circuitry is arranged, in response to a given increment event, to increment the pointer values of one or more of the pointers in dependence on a plurality of different increment evaluation functions applied by the increment circuitry, where each increment evaluation function is associated with one of the pointers in the plurality of pointers and is used to determine whether to increment the pointer value of the associated pointer in response to the given increment event.

15. An apparatus as in any preceding clause when dependent on clause 2, wherein when performance of the lookup operation results in a cache miss the cache circuitry is arranged to perform an allocation operation to allocate a cache entry within which to store the resolved behaviour for the given control flow instruction along with the comparison tag value as the stored associated tag value.

16. An apparatus as in any preceding clause, wherein:
the tracker circuitry is arranged to maintain a plurality of additional tracker entries;
at least when a given condition is met, the tracker circuitry is arranged to allocate one or more of the additional tracker entries for that given control flow instruction, each allocated additional tracker entry providing an enhanced control flow instruction identifier determined from an address of the given control flow instruction and identifier information indicative of from where within a program a function containing the given control flow instruction is called;
when considering the given control flow instruction as tracked in a given additional tracker entry, the enhanced control flow instruction identifier stored in the given additional tracker entry is used as the address indication when generating the associated tag values stored in cache entries and the comparison tag values used in lookup operations.

17. An apparatus as in any preceding clause, further comprising:
flush circuitry configured to generate a flush in response to a control flow misprediction;
wherein the flush circuitry is configured to maintain contents of the tracker circuitry and the cache circuitry during the flush.

18. An apparatus as in Clause 17, further comprising:
recover circuitry configured to recover a previous pointer value of the plurality of pointers in response to the flush.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative embodiments of the invention have been described in detail herein with reference to the accompanying drawings, it is to be understood that the invention is not limited to those precise embodiments, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:
   pointer storage to store pointer values for a plurality of pointers;
   increment circuitry, responsive to a series of increment events, to differentially increment the pointer values of the pointers;
   tracker circuitry to maintain a plurality of tracker entries, each tracker entry to identify a control flow instruction and a current active pointer to be associated with that control flow instruction, where the current active pointer is selected from amongst the plurality of pointers;
   cache circuitry to maintain a plurality of cache entries, each cache entry to store a resolved behaviour of an instance of a control flow instruction identified by a tracker entry of the tracker circuitry along with an associated tag value generated when the resolved behaviour was allocated into that cache entry, and for each entry in at least a subset of the entries the associated tag value is generated in dependence on an address indication of the control flow instruction whose resolved behaviour is being stored in that entry and the current active pointer associated with that control flow instruction; and
   prediction circuitry, responsive to a prediction trigger associated with a replay of a given instance of a given control flow instruction identified by a tracker entry of the tracker circuitry, to cause a lookup operation to be performed by the cache circuitry using a comparison tag value generated in dependence on the address indication of the given control flow instruction and the current active pointer, and in the event of a hit being detected in a given cache entry, to use the resolved behaviour stored in the given cache entry as the predicted behaviour of the given instance of the given control flow instruction, provided a prediction confidence metric is met.

2. An apparatus as claimed in claim 1, wherein:
   each tracker entry further provides an active pointer confidence indication for the current active pointer;
   each time a resolved behaviour is provided for the given control flow instruction, the cache circuitry is arranged to perform a lookup operation using the comparison tag value, and in the event of the comparison tag value matching the associated tag value stored in an accessed entry of the plurality of cache entries, the tracker circuitry is arranged to update the active pointer confidence indication in the tracker entry for the given control flow instruction in dependence on whether the provided resolved behaviour matches the resolved behaviour stored in the accessed entry; and
   the prediction circuitry is arranged to reference the active pointer confidence indication as stored in the tracker entry when determining whether the prediction confidence metric is met.

3. An apparatus as claimed in claim 2, wherein the tracker circuitry is arranged to update the active pointer confidence indication in the tracker entry for the given control flow instruction to indicate an enhanced confidence when the provided resolved behaviour matches the resolved behaviour stored in the accessed entry, and to otherwise update the active pointer confidence indication in the tracker entry for the given control flow instruction to indicate a decreased confidence.

4. An apparatus as claimed in claim 3, wherein the tracker circuitry is arranged to inhibit update of the active pointer confidence indication in the tracker entry for the given control flow instruction when the resolved behaviour stored in the accessed entry indicates the same behaviour as would be predicted by a reference prediction mechanism.

5. An apparatus as claimed in claim 1, further comprising:
   tag value generation circuitry to apply a tag value generation function to generate the associated tag values stored in cache entries and the comparison tag values used in lookup operations, the tag value generation function using as inputs an address indication of a selected control flow instruction and pointer information of a pointer to be associated with that selected control flow instruction.

6. An apparatus as claimed in claim 5, wherein the pointer information comprises a pointer indication to identify the pointer and the pointer value of the identified pointer.

7. An apparatus as claimed in claim 2, wherein:
   each tracker entry further identifies a current training pointer to be associated with the control flow instruction identified by that tracker entry and a training pointer confidence indication for the current training pointer, where the current training pointer is selected from amongst the plurality of pointers;
   each time the resolved behaviour is provided for the given control flow instruction, the cache circuitry is arranged to perform a further lookup operation using a further comparison tag value generated in dependence on the address indication of the given control flow instruction and the current training pointer, and in the event of the further comparison tag value matching the associated tag value stored in a further accessed entry of the plurality of cache entries accessed during the further lookup operation, the tracker circuitry is arranged to update the training pointer confidence indication in the tracker entry for the given control flow instruction in dependence on whether the provided resolved behaviour matches the resolved behaviour stored in the further accessed entry.

8. An apparatus as claimed in claim 7, wherein:
   each tracker entry further identifies a training counter which is incremented in response to each occurrence of a training event;
   the tracker circuitry is responsive to the training counter reaching a determined threshold for a given tracker entry, to determine whether the training pointer confidence indication indicates a greater confidence than is indicated by the active pointer confidence indication, and in that event to update the given tracker entry to identify the current training pointer as being the current active pointer, and to select another pointer from the plurality of pointers as a new current training pointer.

9. An apparatus as claimed in claim 8, wherein:
when the training pointer confidence indication indicates a greater confidence than is indicated by the active pointer confidence indication, the tracker circuitry is further arranged to update the given tracker entry to identify the current training pointer confidence indication as being the active pointer confidence indication, to reset the training pointer confidence indication for the new current training pointer, and to reset the training counter.

10. An apparatus as claimed in claim 1, wherein the increment event is a backwards taken branch.

11. An apparatus as claimed in claim 1, wherein the resolved behaviour stored in a given cache entry is a branch direction outcome of an instance of a control flow instruction identified by a tracker entry of the tracker circuitry.

12. An apparatus as claimed in claim 1, wherein the increment circuitry is arranged, in response to a given increment event, to increment the pointer values of one or more of the pointers in dependence on a plurality of different increment evaluation functions applied by the increment circuitry, where each increment evaluation function is associated with one of the pointers in the plurality of pointers and is used to determine whether to increment the pointer value of the associated pointer in response to the given increment event.

13. An apparatus as claimed in claim 2, wherein when performance of the lookup operation results in a cache miss the cache circuitry is arranged to perform an allocation operation to allocate a cache entry within which to store the resolved behaviour for the given control flow instruction along with the comparison tag value as the stored associated tag value.

14. An apparatus as claimed in claim 1, wherein:
the tracker circuitry is arranged to maintain a plurality of additional tracker entries;
at least when a given condition is met, the tracker circuitry is arranged to allocate one or more of the additional tracker entries for the given control flow instruction, each allocated additional tracker entry providing an enhanced control flow instruction identifier determined from an address of the given control flow instruction and identifier information indicative of from where within a program a function containing the given control flow instruction is called;
when considering the given control flow instruction as tracked in a given additional tracker entry, the enhanced control flow instruction identifier stored in the given additional tracker entry is used as the address indication when generating the associated tag values stored in cache entries and the comparison tag values used in lookup operations.

15. An apparatus as claimed in claim 1, further comprising:
flush circuitry configured to generate a flush in response to a control flow misprediction;
wherein the flush circuitry is configured to maintain contents of the tracker circuitry and the cache circuitry during the flush.

16. An apparatus as claimed in claim 15, further comprising:
recover circuitry configured to recover a previous pointer value of the plurality of pointers in response to the flush.

17. A method of predicting behaviour of control flow instructions, comprising:
maintaining pointer values for a plurality of pointers and, responsive to a series of increment events, differentially incrementing the pointer values of the pointers;
employing tracker circuitry to maintain a plurality of tracker entries, each tracker entry identifying a control flow instruction and a current active pointer to be associated with that control flow instruction, where the current active pointer is selected from amongst the plurality of pointers;
employing cache circuitry to maintain a plurality of cache entries, each cache entry for storing a resolved behaviour of an instance of a control flow instruction identified by a tracker entry of the tracker circuitry along with an associated tag value generated when the resolved behaviour was allocated into that cache entry, and for each entry in at least a subset of the entries the associated tag value is generated in dependence on an address indication of the control flow instruction whose resolved behaviour is being stored in that entry and the current active pointer associated with that control flow instruction; and
responsive to a prediction trigger associated with a replay of a given instance of a given control flow instruction identified by a tracker entry of the tracker circuitry, causing a lookup operation to be performed by the cache circuitry using a comparison tag value generated in dependence on the address indication of the given control flow instruction and the current active pointer, and in the event of a hit being detected in a given cache entry, using the resolved behaviour stored in the given cache entry as the predicted behaviour of the given instance of the given control flow instruction, provided a prediction confidence metric is met.

18. A non-transitory computer-readable medium to store computer-readable code for fabrication of a data processing apparatus comprising:
pointer storage to store pointer values for a plurality of pointers;
increment circuitry, responsive to a series of increment events, to differentially increment the pointer values of the pointers;
tracker circuitry to maintain a plurality of tracker entries, each tracker entry to identify a control flow instruction and a current active pointer to be associated with that control flow instruction, where the current active pointer is selected from amongst the plurality of pointers;
cache circuitry to maintain a plurality of cache entries, each cache entry to store a resolved behaviour of an instance of a control flow instruction identified by a tracker entry of the tracker circuitry along with an associated tag value generated when the resolved behaviour was allocated into that cache entry, and for each entry in at least a subset of the entries the associated tag value is generated in dependence on an address indication of the control flow instruction whose resolved behaviour is being stored in that entry and the current active pointer associated with that control flow instruction; and
prediction circuitry, responsive to a prediction trigger associated with a replay of a given instance of a given control flow instruction identified by a tracker entry of the tracker circuitry, to cause a lookup operation to be performed by the cache circuitry using a comparison tag value generated in dependence on the address indication of the given control flow instruction and the current active pointer, and in the event of a hit being detected in a given cache entry, to use the resolved behaviour stored in the given cache entry as the predicted behaviour of the given instance of the given control flow instruction, provided a prediction confidence metric is met.

19. A system comprising:
the apparatus of claim 1, implemented in at least one packaged chip;
at least one system component; and
a board,
wherein the at least one packaged chip and the at least one system component are assembled on the board.

20. A chip-containing product comprising the system of claim 19 assembled on a further board with at least one other product component.

\* \* \* \* \*